US007332453B2

(12) United States Patent
Rosenflanz et al.

(10) Patent No.: US 7,332,453 B2
(45) Date of Patent: Feb. 19, 2008

(54) CERAMICS, AND METHODS OF MAKING AND USING THE SAME

(75) Inventors: Anatoly Z. Rosenflanz, Maplewood, MN (US); Berkan K. Endres, Woodbury, MN (US); Thomas J. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 384 days.

(21) Appl. No.: 10/902,455

(22) Filed: Jul. 29, 2004

(65) Prior Publication Data

US 2006/0021285 A1 Feb. 2, 2006

(51) Int. Cl.
*C03C 10/02* (2006.01)
*C03C 3/253* (2006.01)
*C03C 3/12* (2006.01)
*C03C 3/14* (2006.01)
*C03C 3/145* (2006.01)
*C03C 3/15* (2006.01)
*C03C 3/155* (2006.01)
*C03C 3/062* (2006.01)
*C03C 3/064* (2006.01)
*C03C 3/068* (2006.01)
*C09K 3/14* (2006.01)
*C03B 32/02* (2006.01)

(52) U.S. Cl. ............... 501/10; 501/41; 501/42; 501/49; 501/50; 501/51; 501/52; 501/73; 501/77; 501/78; 501/79; 51/308; 51/309

(58) Field of Classification Search .................. 501/41, 501/42, 49, 50, 51, 52, 73, 77, 78, 79, 10; 51/308, 309
See application file for complete search history.

(56) References Cited

U.S. PATENT DOCUMENTS

| | | | |
|---|---|---|---|
| 2,206,081 A | 7/1940 | Eberlin | |
| 2,805,166 A | 9/1957 | Loffler | |
| 3,635,739 A | 1/1972 | MacDowell et al. | |
| 3,637,361 A | 1/1972 | Kita et al. | |
| 3,650,780 A | 3/1972 | Connelly | |
| 3,754,976 A | 8/1973 | Elmer et al. | |
| 3,926,603 A | 12/1975 | Plesslinger et al. | |
| 3,928,515 A | 12/1975 | Richmond et al. | |
| 3,947,281 A | 3/1976 | Bacon | |
| 4,014,122 A | 3/1977 | Woods | |
| 4,097,295 A | 6/1978 | Chyung et al. | |
| 4,111,668 A | 9/1978 | Walker et al. | |
| 4,111,707 A | 9/1978 | Komorita et al. | |
| 4,182,437 A | 1/1980 | Roberts et al. | |
| 4,217,264 A | 8/1980 | Mabie et al. | |
| 4,271,011 A | 6/1981 | Spencer et al. | |
| 4,341,533 A | 7/1982 | Daire et al. | |
| 4,472,511 A | 9/1984 | Mennemann et al. | |
| 4,530,909 A | 7/1985 | Makishima et al. | |
| 4,552,199 A | 11/1985 | Onoyama et al. | |
| 4,584,279 A | 4/1986 | Grabowski et al. | |
| 4,705,656 A | 11/1987 | Onoyama et al. | |
| 4,757,036 A | 7/1988 | Kaar et al. | |
| 4,762,677 A | 8/1988 | Dolgin | |
| 4,772,511 A | 9/1988 | Wood et al. | |
| 4,789,501 A | 12/1988 | Day et al. | |
| 4,812,422 A | 3/1989 | Yuhaku et al. | |
| 4,829,031 A | 5/1989 | Roy et al. | |
| 4,940,678 A | 7/1990 | Aitken | |
| 4,997,461 A | 3/1991 | Markhoff-Matheny et al. | |
| 5,013,696 A | 5/1991 | Greskovich et al. | |
| 5,023,212 A | 6/1991 | Dubots et al. | |
| 5,045,402 A | 9/1991 | Adams, Jr. et al. | |
| 5,057,018 A | 10/1991 | Bowen | |
| 5,071,801 A | 12/1991 | Bedard et al. | |
| 5,085,671 A | 2/1992 | Martin et al. | |
| 5,104,319 A | 4/1992 | Evans et al. | |
| 5,104,830 A | 4/1992 | Drouet et al. | |
| 5,122,176 A | 6/1992 | Goettler | |
| 5,178,335 A | 1/1993 | Mertens | |
| 5,215,563 A | 6/1993 | LaCourse et al. | |
| 5,229,336 A | 7/1993 | Akiyama et al. | |
| 5,336,280 A | 8/1994 | Dubots et al. | |
| 5,378,662 A | 1/1995 | Tsuyuki | |
| 5,413,974 A | 5/1995 | Yokoyama et al. | |
| 5,449,389 A | 9/1995 | Yoshizumi et al. | |
| 5,484,752 A | 1/1996 | Waku et al. | |
| 5,534,843 A | 7/1996 | Tsunoda et al. | |
| 5,552,213 A | 9/1996 | Eschner | |
| 5,569,547 A | 10/1996 | Waku et al. | |
| 5,605,870 A | 2/1997 | Strom-Olsen et al. | |
| 5,665,127 A | 9/1997 | Moltgen et al. | |
| 5,693,239 A | 12/1997 | Wang et al. | |
| 5,733,178 A | 3/1998 | Ohishi | |
| 5,733,564 A | 3/1998 | Lehtinen | |
| 5,747,397 A | 5/1998 | McPherson et al. | |
| 5,763,345 A | 6/1998 | Ohshima et al. | |
| 5,804,513 A | 9/1998 | Sakatani et al. | |
| 5,839,674 A | 11/1998 | Ellis | |
| 5,856,254 A | 1/1999 | Feige et al. | |
| 5,902,763 A | 5/1999 | Waku et al. | |
| 5,952,256 A | 9/1999 | Morishita et al. | |
| 5,976,274 A | 11/1999 | Inoue et al. | |
| 5,981,413 A | 11/1999 | Hale | |
| 5,981,415 A | 11/1999 | Waku et al. | |
| 6,054,093 A | 4/2000 | Torre, Jr. et al. | |

(Continued)

FOREIGN PATENT DOCUMENTS

DE 20 34 011 7/1970

(Continued)

OTHER PUBLICATIONS

Aguilar et al, "Melt Extraction Processing of Structural $Y_2O_3$-$Al_2O_3$ Fibers", J. Eur. Ceram. Soc. 20 1091-1098 (2000).

(Continued)

*Primary Examiner*—David M Brunsman
(74) *Attorney, Agent, or Firm*—Gregory D. Allen

(57) ABSTRACT

Ceramics (including glasses and glass-ceramics) comprising nitrogen, and methods of making the same.

46 Claims, 6 Drawing Sheets

U.S. PATENT DOCUMENTS

| | | | |
|---|---|---|---|
| 6,123,743 A | 9/2000 | Carman et al. | |
| 6,128,430 A | 10/2000 | Chu et al. | |
| 6,146,244 A | 11/2000 | Atsugi et al. | |
| 6,214,429 B1 | 4/2001 | Zou et al. | |
| 6,245,700 B1 | 6/2001 | Budd et al. | |
| 6,251,813 B1 | 6/2001 | Sato | |
| 6,254,981 B1 | 7/2001 | Castle | |
| 6,268,303 B1 | 7/2001 | Aitken et al. | |
| 6,306,926 B1 | 10/2001 | Bretscher et al. | |
| 6,329,309 B1* | 12/2001 | Kanamaru et al. | 501/56 |
| 6,335,083 B1 | 1/2002 | Kasai et al. | |
| 6,361,414 B1 | 3/2002 | Ravkin et al. | |
| 6,362,119 B1 | 3/2002 | Chiba | |
| 6,447,937 B1 | 9/2002 | Murakawa et al. | |
| 6,451,077 B1 | 9/2002 | Rosenflanz | |
| 6,454,822 B1 | 9/2002 | Rosenflanz | |
| 6,458,731 B1 | 10/2002 | Rosenflanz | |
| 6,461,988 B2 | 10/2002 | Budd et al. | |
| 6,469,825 B1 | 10/2002 | Digonnet et al. | |
| 6,482,758 B1 | 11/2002 | Weber et al. | |
| 6,482,761 B1 | 11/2002 | Watanabe et al. | |
| 6,484,539 B1 | 11/2002 | Nordine et al. | |
| 6,511,739 B2 | 1/2003 | Kasai et al. | |
| 6,513,739 B2 | 2/2003 | Fritz et al. | |
| 6,514,892 B1 | 2/2003 | Kasai et al. | |
| 6,557,378 B2 | 5/2003 | Takagi et al. | |
| 6,582,488 B1 | 6/2003 | Rosenflanz | |
| 6,583,080 B1 | 6/2003 | Rosenflanz | |
| 6,589,305 B1 | 7/2003 | Rosenflanz | |
| 6,592,640 B1 | 7/2003 | Rosenflanz et al. | |
| 6,596,041 B2 | 7/2003 | Rosenflanz | |
| 6,607,570 B1 | 8/2003 | Rosenflanz et al. | |
| 6,620,214 B2 | 9/2003 | McArdle et al. | |
| 6,666,750 B1 | 12/2003 | Rosenflanz | |
| 6,669,749 B1 | 12/2003 | Rosenflanz et al. | |
| 6,706,083 B1 | 3/2004 | Rosenflanz | |
| 6,818,578 B2 | 11/2004 | Tachiwama | |
| 6,833,014 B2 | 12/2004 | Welygan et al. | |
| 2001/0030811 A1 | 10/2001 | Kasai et al. | |
| 2002/0066233 A1 | 6/2002 | McArdle et al. | |
| 2002/0160694 A1 | 10/2002 | Wood et al. | |
| 2003/0040423 A1 | 2/2003 | Harada et al. | |
| 2003/0110706 A1 | 6/2003 | Rosenflanz | |
| 2003/0110707 A1 | 6/2003 | Rosenflanz et al. | |
| 2003/0110708 A1 | 6/2003 | Rosenflanz | |
| 2003/0110709 A1 | 6/2003 | Rosenflanz et al. | |
| 2003/0115805 A1 | 6/2003 | Rosenflanz et al. | |
| 2003/0126802 A1 | 7/2003 | Rosenflanz | |
| 2003/0126803 A1 | 7/2003 | Rosenflanz | |
| 2003/0126804 A1 | 7/2003 | Rosenflanz et al. | |
| 2003/0145525 A1 | 8/2003 | Rosenflanz | |
| 2004/0020245 A1 | 2/2004 | Rosenflanz et al. | |
| 2004/0023078 A1 | 2/2004 | Rosenflanz et al. | |
| 2004/0148868 A1 | 8/2004 | Anderson et al. | |
| 2004/0148869 A1 | 8/2004 | Celikkaya et al. | |
| 2004/0148870 A1 | 8/2004 | Celikkaya et al. | |
| 2004/0148966 A1 | 8/2004 | Celikkaya et al. | |
| 2004/0148967 A1 | 8/2004 | Celikkaya et al. | |
| 2004/0152034 A1 | 8/2004 | Cummings et al. | |
| 2004/0213539 A1 | 10/2004 | Anderston et al. | |
| 2004/0221515 A1 | 11/2004 | McArdle et al. | |
| 2005/0060948 A1 | 3/2005 | Rosenflanz | |
| 2005/0065012 A1 | 3/2005 | Rosenflanz et al. | |
| 2005/0065013 A1 | 3/2005 | Rosenflanz et al. | |
| 2005/0132655 A1 | 6/2005 | Anderson et al. | |
| 2005/0132656 A1 | 6/2005 | Anderson et al. | |
| 2005/0132657 A1 | 6/2005 | Celikkya et al. | |
| 2005/0132658 A1 | 6/2005 | Celikkaya et al. | |
| 2005/0133974 A1 | 6/2005 | Celikkaya et al. | |
| 2005/0137076 A1 | 6/2005 | Rosenflanz et al. | |
| 2005/0137077 A1 | 6/2005 | Bange et al. | |
| 2005/0137078 A1 | 6/2005 | Anderson et al. | |
| 2006/0022385 A1 | 2/2006 | Rosenflanz | |

FOREIGN PATENT DOCUMENTS

| | | |
|---|---|---|
| EP | 0 227 374 | 7/1987 |
| EP | 0 469 271 | 2/1992 |
| EP | 0 494 638 | 7/1992 |
| EP | 0 495 536 A2 | 7/1992 |
| EP | 0 579 281 A1 | 1/1994 |
| EP | 0 709 347 | 5/1996 |
| FR | 1547 989 | 10/1968 |
| FR | 2 118 026 | 7/1972 |
| FR | 2 609 708 | 7/1988 |
| GB | 709503 | 4/1958 |
| GB | 1005338 | 9/1965 |
| GB | 1 260 933 A | 1/1972 |
| GB | 2 116 992 | 10/1983 |
| GB | 2 377 438 A | 1/2003 |
| JP | 59 22 7726 A | 12/1984 |
| JP | 60221338 | 11/1985 |
| JP | 61099665 | 5/1986 |
| JP | 62-003041 | 1/1987 |
| JP | 63-156024 | 6/1988 |
| JP | 63-303821 | 12/1988 |
| JP | 03-113428 | 5/1991 |
| JP | 4-119941 | 4/1992 |
| JP | 05-226733 | 9/1993 |
| JP | 06-171974 | 6/1994 |
| JP | 11-189926 | 7/1999 |
| JP | 2003-94414 | 4/2003 |
| KR | 9601009 B1 | 1/1996 |
| SU | 145569 | 10/1996 |
| WO | WO 94/14722 | 7/1994 |
| WO | WO 97/16385 | 5/1997 |
| WO | WO 97/25284 | 7/1997 |
| WO | WO 00/34201 | 6/2000 |
| WO | WO 01/16047 A2 | 3/2001 |
| WO | WO 01/23321 A1 | 4/2001 |
| WO | WO 01/23323 A1 | 4/2001 |
| WO | WO 01/27046 A1 | 4/2001 |
| WO | WO 01/56946 A | 8/2001 |
| WO | WO 01/56947 A | 8/2001 |
| WO | WO 01/56949 A | 8/2001 |
| WO | WO 01/56950 A | 8/2001 |
| WO | WO 02/08146 A | 1/2002 |

OTHER PUBLICATIONS

Bagaasen, L.M., et al., "Silicon-free oxynitride glasses via nitridation of aluminate glassmelts" *Journal of the American Ceramic Society*, vol. 66, No. 4, pp. 69-71. (1983).

Brockway et al. "Rapid Solidification of Ceramics a Technology Assessment", *Metals and Ceramics Information Center*, MCIC Report, Jan. 1984 MCIC 84-49.

Coutures et al., "Production and Studies of Alumina Based Refractory Glass," *Mat. Res. Bull.*, vol. 10, No. 6, 1975, pp. 539-546.

Durham, James A. et al., "Low Silica Calcium Aluminate Oxynitride Glasses", *Materials Letters*, vol. 7, No. 5,6, Nov. 1988.

Figs. 311, 346, 350, 354-56, 373, and 716, *Phase Diagrams For Ceramists*, The American Ceramic Society, 1964, pp. 122, 136, 138, 140, 144, 248.

Figs. 2340-44, 2363, 2370, 2374-75, 2382-83, 2385, 2387, 2390, and 2392, *Phase Diagrams For Ceramists, 1969 Supplement*, The American Ceramic Society, 1969, pp. 95-96, 100, 102-103, 105-108.

Figs. 4366-71, 4377-78, 4404-05, 4417, 4426, 4430, 4433, 4437, 4440, 4444, 4457, 4572, and 4602, *Phase Diagrams For Ceramists, 1975 Supplement*, The American Ceramic Society, 1975, pp. 130-132, 135-136, 147, 152, 157, 159-160, 163-164, 166, 172-173, 238, 257.

Figs. 5042, 5211, 5217, 5224, 5228, 5232, 5237, 5239, 5241, 5251, 5257, 5418, and 5437, *Phase Diagrams For Ceramists*, vol. IV, The American Ceramic Society, 1981, pp. 29, 125, 127, 129-131, 133, 135-137, 139, 141, 143, 220, 228.

Fig. 6464, *Phase Diagrams For Ceramists*, vol. VI, The American Ceramic Society, 1981, p. 162.

Figs. 9262, and 9264, *Phase Diagrams For Ceramists*, vol. XI, Oxides, The American Ceramic Society, 1995, pp. 105-106.

Harris et al., "DURABLE 3-5 μm Transmitting Infrared Window Materials," Infrared Physics & Technology 39, 1998, pp. 185-201.

Hrovat et al., "Preliminary data on subsolidus phase equilibria in the $La_2O_3$-$Al_2O_3$-$Mn_2O_3$ and $La_2O_3$-$Al_2O_3$-$Fe_2O_3$ Systems", *Journal of Materials Science Letters*, vol. 14, 1995, pp. 265-267.

Imoka, Minoru et al., "Refractive Index and Abbe's Number of Glass of Lanthanum Borate System", Journal Ceramic Assoc. Japan, vol. 70, No. 5, (1962), pp. 115.

Isobe, T. et al., "Microstructure and Thermal Stability of $Al_2O_3$/$Y_3Al_5O_{12}$ (YAG) Eutectic Composite Prepared by an Arc Discharge Method", J. Cream. Soc. Jap., 109, [1], 2001, pp. 66-70, Abstract in English.

Jantzen, C.M., Krepski, R.P., & Herman, H., "Ultra-Rapid Quenching of Laser-Method Binary and Unary Oxides", *Mat. Res. Bill.* 15, 1313-1326 (1980).

Khor K.A., "Novel ZrO2-Mullite Composites Produced By Plasma Spraying", Proceedings of the 15th International Thermal Pay Conference, May 25-29, 1998, Nice, France.

Kingery, W.D., Introduction to Ceramics, Second Edition, Chpt. III subchapter 8.8, Glass-Ceramic Materials, pp. 368-374, (1976).

Kokubo, Tadashi et al., "Infrared Transmission of ($R_2O$ or R'O)-($TiO_2$, $Nb_2O_5$ or $Ta_2O_5$)-$Al_2O_3$ Glasses", Journal of Non-Crystalline Solids 22 (1970), 125-134.

Kondrashow V I et al., "Opacified Glass "Decorit" Synthesis Directions", Steklo I Keramika 2001, No. 1, pp. 8-11. Title translated by Keramika as "Aspects of Synthesis of Decorite Opacified Glass".

Krokhin et al., "Synthesis of Y-Al Garnet", *Glass and Ceramics*, vol. 55, Nos. 5-6, 1998, pp. 151-152.

Lakiza et al., "The Liquidus Surface In The $Al_2O_3$-$ZrO_2$-$Y_2O_3$ Phase Diagram", *Powder Metallurgy and Metal Ceramics*, vol. 33, No. 11-12, 1994, pp. 595-597.

Lakiza et al., "Methods of Investigation Of Properties Of Powder Materials, Interactions In The $Al_2O_3$-$ZrO_2$-$Y_2O_3$ System", *Powder Metallurgy and Metal Ceramics*, vol. 33, Nos. 9-10, 1994, pp. 486-490.

Lakiza et al., "Powder-Material Research Methods And Properties Polythermal Sections Of The $Al_2O_3$-$ZrO_2$-$Y_2O_3$ Phase Diagram", *Powder Metallurgy and Metal Ceramics*, vol. 34, No. 11-12, 1995, pp. 655-659.

Lakiza et al., "Solidus Surface And Phase Equilibria During The Solidification Of Alloys In The $Al_2O_3$-$ZrO_2$-$Y_2O_3$ System", *Powder Metallurgy and Metal Ceramics*, vol. 34, Nos. 1-2, 1995, pp. 64-67.

Lakiz and Lopato, "Metastable Phase Relationships In The System $Al_2O_3$-$ZrO_2$-$Y_2O_3$", *Powder Metallurgy and Metal Ceramics*, vol. 35, Nos. 11-12, 1996, pp. 621-626.

Mah, Tai-I1 et al., "Processing, Microstructure, and Strength of Alumina-YAG Eutectic Polycrystals", J. Am. Ceram. Soc., 83, [8], 2000, pp. 2088-2090.

McKittrick, Joanna, et al., "Non-stoichiometry and defect structures in rapidly solidified MgO-$Al_2O_3$-$ZrO_2$ ternary eutectics," *Materials Science and Engineering* A231 (1997) 90-97.

O'Meara, O.C., et al.. "Formation, Crystallisation and Oxidation of Selected Galsses in the Y-Si-Al-O-N System", *Journal of the European Ceramic Society* vol. 8, (1991), pp. 161-170.

Ray, C.S. and Day, D.E., "Determining the Nucleation Rate Curve for Lithium Disilicate Glass by Differential Thermal Analysis", J. Am. Ceram. Soc. 73(2) 439-442 (1990).

Rosenflanz, Anatoly et al., "Bulk glasses and ultrahard nanoceramics based on alumina and rare-earth oxides", *Nature*, vol. 430, Aug. 12, 20204, pp. 761-764, www.nature.com/nature.

Sarjeant, P.T., & Roy, in *Reactivity of Solids* (ed. J. W. Mitchell, R.C., DeVries, R.W., Roberts and P. Cannon) 725-33 (John Wiley & Sons, Inc., New York 1969).

Schmucker, M, et al., "Constitution of Mullite Glasses Produced by Ultra-Rapid Quenching of Plasma-Sprayed Melts", Journal of the European Ceramic society 15 (1995) 1201-1205.

Shishido et al., "$Gd_3Al_5O_{12}$ Phase Obtained by Crystallization of amorphous $Gd_2O_3$ $^5/3$ $Al_2O_3$," *Journal of the American Ceramic Society*, vol. 61, No. 7-8, Jul.-Aug. 1978, pp. 373-374.

Standard: "Standard Specification for Wire Cloth and Sieves for Testing Purposes[1]," ASTM International, Designation: E 11-01, (date unknown but prior to filing date of instant application), pp. 1-5.

Standard: "Nominal Dimensions, Permissible Variations for Wire Cloth of Standard test Sieves (U.S.A.) Standard Series," ASTM International, Designation: E-11, (Date unknown but prior to filing date of instant application), pp. 3-6.

Standard: "Standard Specification for Industrial Woven Wire Cloth[1]", ASTM International Designation: E 2016-99, (date unknown but prior to filing date of instant application), pp. 1-30.

Stankus, S. V. et al., "Crystallization and Thermal Properties of $Al_2O_3$-$Y_2O_3$ Melts", J. Crystal Growth, 167, 1996, pp. 165-170.

Stookey. S. D., Ceramics Made by Nucleation of Glass-Comparison of Microstructure and Properties with Sintered Ceramics, The American Ceramic Society, (1992), pp. 1-4.

Suzuki et al., "Rapid Quenching on the Binary Systems of High Temperature Oxides,"*Mat. Res. Bull.*, vo. 9, 1974, pp. 745-754.

Takamori, T., & Roy, R., "Rapid Crystallization of $SiO_2$-$Al_2O_3$ Glasses", Journal of American Society, vol. 56, No. 12, Dec. 1973.

Toropov et al., "Phase Equilibria in the Yttrium Oxide-Alumina System", *Bulletin of the Academy of Sciences*, USSR, Division of Chemical Science, No. 7, Jul. 1964, pp. 1076-1081, A translation of *Seriya Khimicheskaya*.

Tredway, W.K., et al., "Multianion glasses", Elsevier Appl. Sci. Publishers, Barking, UK, pp. 203-212, (1986), Conference Date Ju. 10-12, 1985 in Limerick, Ireland.

van den Hoven et al., "Net Optical Gain at 1.53 μm in Er-Doped $Al_2O_3$ Waveguides on Silicon," Appl. Phys. Lett. 68 (14), Apr. 1, 1966, pp. 1886-1888.

Varshneya, Arun K., "Fundamentals of Inorganic Glasses", pp. 425-427 (1994).

Waku et al., "A ductile ceramic eutectic composite with igh strength at 1,873 K", *Nature*, vol. 389, Sep. 1997, pp. 49-52.

Waku, Yoshiharu, "A New Ceramic Eutectic Composite with High Strength at 1873 K", *Advanced Materials*, vol. 10, No. 8, 1998, pp. 615-617.

Waku et al., "High-temperature strength and thermal stabiligy of a unidirectionally solidified $Al_2O_3$/YAG eutectic composite", pp. 1217-1225.

Waku et al., "Sapphire matrix composites reinforced with single crystal VAG phases", *Journal of Materials Science*, vol. 31, 1996, pp. 4663-4670.

Waku, Yoshiharu, et al., "A jelly-like ceramic fiber at 1193 K", Mat Res Innovat, 2000, vol. 3, pp. 185-189.

Wang, S. et al., "Divorced Eutectic and Interface Characteristics in a Solidfield YAG-Spinel Composite With Spinel-Rich Composition", J. Mat. Sci., 35, 2000, pp. 2757-2761.

Wang, Shuqiang et al., "Eutectic Precipitation of the Spinel Solid Solution-Yttrium Aluminum Garnet (YAG) System," *Journal of the American Ceramic Society*, 1998, vol. 81, No. 1, pp. 263-265.

Weber et al., "Device Materials Based on Er-, Ho-, Tm-, and Yb-Doped Rare Earth Aluminum Oxide (REA1™) Glass, refernece obtained in 2003, and believed to be based on a talk presented Jan. 28, 2003 (See website http://www.spie.org/Conferences/Programs/03/pw/opto/index.cfm?fuseaction=4999, pp. 1 and 2 of 5).

Weber et al., "Rare Earth Oxide-Aluminum Oxide Glasses for Mid-Range IR Devices," reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).

Weber et al., "Synthesis and Optical Properties of Rare-Earth-Aluminum Oxide Glasses", J. Am. Ceram. Soc. 85(5) 1309-1311 (2002).

Weber, J.K. Richard et al., "Glass fibres of pure and erbium- or neodymium-doped yttria-alumina compositions", Nature, Jun. 25, 1998, vol. 393, pp. 769-711.

Weber, J.K. Richard et al., "Glass Formation and Polyamorphism in Rare-Earth Oxide-Aluminum Oxide Compositions", J. American Ceramic Society, 83 [8],2000, 1868-1872.

Wilding, M.C., McMillan, P.F., "Polymorphic Transitions in Yttria-Alumina Liquids", *J. Non-Cryst. Soilids.* 293-295, 357-365 (2001).

Wu, Yiquan, et al., "Liquid-phase sintering of alumina with YsialON oxynitride glass", *Materials Letters*, vol. 57 (2003) 3521-3525.

Yajima et al., Glass Formation in the Ln-Al-O System, (Ln: Lanthanoid and Yttrium Elements), Chemistry Letters, 1973, pp. 1327-1330.

Yajima et al., "Unusual Glass Formation in the A1-Nd-O System," Chemistry Letters (published by the Chemical Society of Japan), 1973, pp. 741-742.

Yan et al., "Erbium-Doped Phosphate Glass Waveguide on Silicon With 4.1 dB/cm Gain at 1.535 μm," Appl. Phys. Lett, 71 (20), Nov. 17, 1997.

Yang and Zhu, "Thermo-Mechanical Stabiligy Of Directionally Solidified $Al_2O_3$-$ZrO_2$($Y_2O_3$) Eutectic Fibers", *Scripta Materialia*, vol. 36, No. 8, 1997, pp. 961-965.

Yoshikawa et al., "Phase Identification of $Al_2O_3$/$RE_3Al_5O_{12}$ and $Al_2O_3$/$REAlO_3$ (RE=Sm–Lu, Y) Eutectics", J. Crystal Growth, 218, 2000, pp. 67-73.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled, "Method of Making Ceramic Articles", filed Aug. 2, 2002, Rosenflanz having U.S. Appl. No. 10/211,481.

U.S. Application entitled "Methods of Making Ceramic Particles", filed Sep. 5, 2003, having U.S. Appl. No. 10/655,729.

* cited by examiner

CERAMICS, AND METHODS OF MAKING AND USING THE SAME

BACKGROUND

A number of glass, crystalline ceramic, and glass-ceramic materials are known, including some materials having oxynitride compositions. Many oxide glass systems utilize well-known glass-formers such as $SiO_2$, $Bi_2O_3$, $B_2O_3$, $P_2O_5$, $GeO_2$, $TeO_2$, $As_2O_3$, and $V_2O_5$ to aid in the formation of the glass. Some of the glass compositions formed with these glass-formers can be heat-treated to form glass-ceramics. The upper use temperature of glasses and glass-ceramics formed from such glass formers is generally less than 1200° C., typically about 700-800° C. The glass-ceramics tend to be more temperature resistant than the glass from which they are formed.

In addition, many properties of known glasses and glass-ceramics are limited by the intrinsic properties of glass-formers. For example, for $SiO_2$, $B_2O_3$, and $P_2O_5$-based glasses and glass-ceramics, the Young's modulus, hardness, and strength are relatively low. These glass and glass-ceramics generally have inferior mechanical properties as compared, for example, to $Al_2O_3$ or $ZrO_2$.

Although some glasses based on rare earth oxide-aluminum oxide (see, e.g., U.S. Pat. No. 6,482,758 (Weber) and Japanese Document No. JP 2000-045129, published Feb. 15, 2000) are known, additional novel glasses and glass-ceramic, as well as use for both known and novel glasses and glass-ceramics, is desirable.

In another aspect, a variety of abrasive particles (e.g., diamond particles, cubic boron nitride particles, fused abrasive particles, and sintered, ceramic abrasive particles (including sol-gel-derived abrasive particles) are known in the art. In some abrading applications, the abrasive particles are used in loose form, while in others the particles are incorporated into abrasive products (e.g., coated abrasive products, bonded abrasive products, non-woven abrasive products, and abrasive brushes).

The abrasive industry continues to desire new abrasive particles and abrasive articles, as well as methods for making the same.

SUMMARY

The present invention includes providing, for example, glasses (including ceramics comprising glass) and glass-ceramics.

In one aspect, the present invention provides a glass comprising (a) at least 35 (in some embodiments, at least 40, 45, 50, 55, 60, 65, 70, or even at least 75) percent by weight $Al_2O_3$ and (b) at least 0.1 (in some embodiments, at least 0.2, 0.3, 0.5, 1, 2, 3, 4, or even at least 5) percent by weight N (i.e., nitrogen), based on the total weight of the glass, wherein the glass contains not more than 10 (in some embodiments, not more than 5, 4, 3, 2, 1, 0.5, 0.1, or even zero) percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass. In some embodiments, the glass further comprises at least one metal oxide other than $Al_2O_3$ (e.g., a metal oxide selected from the group consisting of BaO, CaO, $CeO_2$, CuO, $Dy_2O_3$, $Er_2O_3$, $Eu_2O_3$, $Gd_2O_3$, $Ho_2O_3$, $La_2O_3$, $Lu_2O_3$, MgO, $Nd_2O_3$, $Pr_6O_{11}$, $Sm_2O_3$, $Sc_2O_3$SrO, $Tb_2O_3$, $Th_4O_7$, $TiO_2$, $Tm_2O_3$, $Yb_2O_3$, $Y_2O_3$, $ZrO_2$, and combinations thereof). In some embodiments, a ceramic comprises the glass.

In another aspect, the present invention provides a glass comprising (a) greater than 70 (in some embodiments, at least 75, 80, 85, 90, 95, or even 100) percent by weight $Al_2O_3$ and (b) at least 0.1 (in some embodiments, at least 0.05, 0.1, 0.2, 0.3, 0.5, 1, 2, 3, 4, or even at least 5) percent by weight N, based on the total weight of the glass. In some embodiments, the glass further comprises at least one metal oxide other than $Al_2O_3$ (e.g., a metal oxide selected from the group consisting of BaO, CaO, $CeO_2$, CuO, $Dy_2O_3$, $Er_2O_3$, $Eu_2O_3$, $Gd_2O_3$, $Ho_2O_3$, $La_2O_3$, $Lu_2O_3$, MgO, $Nd_2O_3$, $Pr_6O_{11}$, $Sm_2O_3$, $Sc_2O_3$, SrO, $Tb_2O_3$, $Th_4O_7$, $TiO_2$, $Tm_2O_3$, $Yb_2O_3$, $Y_2O_3$, $ZrO_2$, and combinations thereof). In some embodiments, a ceramic comprises the glass.

In another aspect, the present invention provides a glass comprising (a) at least 35 (in some embodiments, at least 40, 45, 50, 55, 60, 65, 70, or even at least 75) percent by weight $Al_2O_3$, based on the total weight of the glass, (b) a first metal oxide other than $Al_2O_3$, (c) a second, different metal oxide other than $Al_2O_3$, and (d) at least 0.1 (in some embodiments, at least 0.2, 0.3, 0.5, 1, 2, 3, 4, or even at least 5) percent by weight N, based on the total weight of the glass, wherein the $Al_2O_3$, the first metal oxide, and the second metal oxide collectively comprise at least 70 (in some embodiments, at least 75, 80, 85, 90, 95, or even 100) percent by weight of the glass, and wherein the glass contains not more than 30 (in some embodiments, not more than 25, 20, 15, 10, 5, 4, 3, 2, 1, 0.5, 0.1, or even zero) percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass. In some embodiments, the first metal oxide is selected from the group consisting of BaO, CaO, $CeO_2$, CuO, $Dy_2O_3$, $Er_2O_3$, $Eu_2O_3$, $Gd_2O_3$, $Ho_2O_3$, $La_2O_3$, $Lu_2O_3$, MgO, $Nd_2O_3$, $Pr_6O_{11}$, $Sm_2O_3$, $Sc_2O_3$, SrO, $Tb_2O_3$, $Th_4O_7$, $TiO_2$, $Tm_2O_3$, $Yb_2O_3$, $Y_2O_3$, and $ZrO_2$. In some embodiments, the first and second metal oxides are independently selected from the group consisting of BaO, CaO, $CeO_2$, CuO, $Dy_2O_3$, $Er_2O_3$, $Eu_2O_3$, $Gd_2O_3$, $Ho_2O_3$, $La_2O_3$, $Lu_2O_3$, MgO, $Nd_2O_3$, $Pr_6O_{11}$, $Sm_2O_3$, $Sc_2O_3$, SrO, $Tb_2O_3$, $Th_4O_7$, $TiO_2$, $Tm_2O_3$, $Yb_2O_3$, $Y_2O_3$, and $ZrO_2$. In some embodiments, a ceramic comprises the glass.

In another aspect, the present invention provides a glass comprising $Al_2O_3$, at least 0.1 (in some embodiments, at least 0.2, 0.3, 0.5, 1, 2, 3, 4, or even at least 5) percent by weight N, based on the total weight of the glass, at least one of REO or $Y_2O_3$, and at least one of $ZrO_2$ or $HfO_2$, wherein at least 80 (in some embodiments, at least 85, 90, 95, 97, 98, 99, or even 100) percent by weight of the glass collectively comprises the $Al_2O_3$, the at least one of REO or $Y_2O_3$, and the at least one of $ZrO_2$ or $HfO_2$, based on the total weight of the glass. In some embodiments, the glass comprises at least 35, 40, 45, 50, 55, 65, 70, or even at least 75 percent by weight $Al_2O_3$, based on the total weight of the glass. In some embodiments, the glass further comprises at least one metal oxide other than $Al_2O_3$, REO, $Y_2O_3$, $HfO_2$, and $ZrO_2$ (e.g., a metal oxide selected from the group consisting of BaO, CaO, MgO, SrO, $TiO_2$, and combinations thereof). In some embodiments, a ceramic comprises the glass.

In another aspect, the present invention provides a glass comprising $Al_2O_3$, at least 0.1 (in some embodiments, at least 0.2, 0.3, 0.5, 1, 2, 3, 4, or even at least 5) percent by weight N, based on the total weight of the glass, at least one of REO or $Y_2O_3$, and at least one of $ZrO_2$ or $HfO_2$, wherein at least 80 (in some embodiments, at least 85, 90, 95, 97, 98, 99, or even 100) percent by weight of the glass collectively comprises the $Al_2O_3$, the at least one of REO or $Y_2O_3$, and the at least one of $ZrO_2$ or $HfO_2$, based on the total weight of the glass. In some embodiments, the glass further comprises at least one metal oxide other than $Al_2O_3$, REO, $Y_2O_3$, $HfO_2$, and $ZrO_2$ (e.g., at least one metal oxide other than $Al_2O_3$, REO, $Y_2O_3$, $HfO_2$, and $ZrO_2$ selected from the group consisting of BaO, CaO, MgO, SrO, $TiO_2$, and combinations thereof). In some embodiments, a ceramic comprises the glass.

In another aspect, the present invention provides methods for making a glass according to the present invention. In one exemplary method for making a glass according to the present invention, the method comprises:
  providing a melt comprising sources of at least the metal oxides and N to be present in the glass (e.g., melting sources of at least the metal oxides and N to be present in the glass to provide a melt); and
  cooling the melt to provide the glass.

In another aspect, the present invention provides a method for making a ceramic comprising a glass according to the present invention. In another exemplary method for making a ceramic comprising glass according to the present invention, the method comprises:
  providing a melt comprising sources of at least the metal oxides and N to be present in the glass (e.g., melting sources of at least the metal oxides and N to be present in the glass to provide a melt); and
  cooling the melt to provide the ceramic.

In another aspect, the present invention provides a method for making an article comprising glass according to the present invention. In one exemplary method for making such an article, the method comprises:
  providing
    glass beads comprising glass according to the present invention, the glass having a $T_g$;
  heating the glass beads above the $T_g$ such that the glass beads coalesce to form a shape; and
  cooling the coalesced shape to provide the article.

In another exemplary method for making an article comprising glass according to the present invention, the method comprises:
  providing glass powder (e.g., crushing glass (e.g., glass beads) to provide glass powder) comprising glass according to the present invention, the glass having a $T_g$;
  heating the glass powder above the $T_g$ such that the glass powder coalesces to form a shape; and
  cooling the coalesced shape to provide the article.

In another aspect, the present invention provides a glass-ceramic comprising (a) at least 35 (in some embodiments, at least 40, 45, 50, 55, 60, 65, 70, or even at least 75) percent by weight $Al_2O_3$ and (b) at least 0.1 (in some embodiments, at least 0.2, 0.3, 0.5, 1, 2, 3, 4, or even at least 5) percent by weight N, based on the total weight of the glass-ceramic, wherein the glass-ceramic contains not more than 10 (in some embodiments, not more than 5, 4, 3, 2, 1, 0.5, 0.1, or even zero) percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass-ceramic.

In another aspect, the present invention provides a glass-ceramic comprising (a) greater than 70 (in some embodiments, at least 75, 80, 85, 90, 95, or even 100) percent by weight $Al_2O_3$ and (b) at least 0.1 (in some embodiments, at least 0.2, 0.3, 0.5, 1, 2, 3, 4, or even at least 5) percent by weight N, based on the total weight of the glass-ceramic.

In another aspect, the present invention provides a glass-ceramic comprising (a) at least 35 (in some embodiments, at least 40, 45, 50, 55, 60, 65, 70, or even at least 75) percent by weight $Al_2O_3$, based on the total weight of the glass-ceramic, (b) a first metal oxide other than $Al_2O_3$, (c) a second, different metal oxide other than $Al_2O_3$, and (d) at least 0.1 (in some embodiments, at least 0.2, 0.3, 0.5, 1, 2, 3, 4, or even at least 5) percent by weight N, based on the total weight of the glass-ceramic, wherein the $Al_2O_3$, the first metal oxide, and the second metal oxide collectively comprise at least 70 (in some embodiments, at least 75, 80, 85, 90, 95, or even 100) percent by weight of the glass-ceramic, and wherein the glass-ceramic contains not more than 30 (in some embodiments, not more than 25, 20, 15, 10, 5, 4, 3, 2, 1, 0.5, 0.1, or even zero) percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass-ceramic. In some embodiments, the first metal oxide is selected from the group consisting of BaO, CaO, $CeO_2$, CuO, $Dy_2O_3$, $Er_2O_3$, $Eu_2O_3$, $Gd_2O_3$, $Ho_2O_3$, $La_2O_3$, $Lu_2O_3$, MgO, $Nd_2O_3$, $Pr_6O_{11}$, $Sm_2O_3$, $Sc_2O_3$, SrO, $Tb_2O_3$, $Th_4O_7$, $TiO_2$, $Tm_2O_3$, $Yb_2O_3$, $Y_2O_3$, and $ZrO_2$. In some embodiments, the first and second metal oxides are independently selected from the group consisting of BaO, CaO, $CeO_2$, CuO, $Dy_2O_3$, $Er_2O_3$, $Eu_2O_3$, $Gd_2O_3$, $Ho_2O_3$, $La_2O_3$, $Lu_2O_3$, MgO, $Nd_2O_3$, $Pr_6O_{11}$, $Sm_2O_3$, $Sc_2O_3$, SrO, $Tb_2O_3$, $Th_4O_7$, $TiO_2$, $Tm_2O_3$, $Yb_2O_3$, $Y_2O_3$, and $ZrO_2$.

In another aspect, the present invention provides a glass-ceramic comprising $Al_2O_3$, at least 0.1 (in some embodiments, at least 0.2, 0.3, 0.5, 1, 2, 3, 4, or even at least 5) percent by weight N, based on the total weight of the glass-ceramic, at least one of REO or $Y_2O_3$, and at least one of $ZrO_2$ or $HfO_2$, wherein at least 80 (in some embodiments, at least 85, 90, 95, 97, 98, 99, or even 100) percent by weight of the glass-ceramic collectively comprises the $Al_2O_3$, the REO, and the at least one of $ZrO_2$ or $HfO_2$, based on the total weight of the glass-ceramic. In some embodiments, the glass-ceramic further comprises at least one metal oxide other than $Al_2O_3$, at least one of REO or $Y_2O_3$, $HfO_2$, and $ZrO_2$ (e.g., at least one metal oxide other than $Al_2O_3$, REO, $Y_2O_3$, $HfO_2$, and $ZrO_2$ selected from the group consisting of BaO, CaO, MgO, SrO, $TiO_2$, and combinations thereof).

In another aspect, the present invention provides a glass-ceramic comprising $Al_2O_3$, at least 0.1 (in some embodiments, at least 0.2, 0.3, 0.5, 1, 2, 3, 4, or even at least 5) percent by weight N, based on the total weight of the glass-ceramic, at least one of REO or $Y_2O_3$, and at least one of $ZrO_2$ or $HfO_2$, wherein at least 80 (in some embodiments, at least 85, 90, 95, 97, 98, 99, or even 100) percent by weight of the glass-ceramic collectively comprises the $Al_2O_3$, the at least one of REO or $Y_2O_3$, and the at least one of $ZrO_2$ or $HfO_2$, based on the total weight of the glass-ceramic. In some embodiments, the glass-ceramic comprises at least 35, 40, 45, 50, 55, 65, 70, or even at least 75 percent by weight $Al_2O_3$, based on the total weight of the glass-ceramic. In some embodiments, the glass-ceramic further comprises at least one metal oxide other than $Al_2O_3$, REO, $Y_2O_3$, $HfO_2$, and $ZrO_2$ (e.g., a metal oxide selected from the group consisting of BaO, CaO, MgO, SrO, $TiO_2$, and combinations thereof).

In another aspect, the present invention provides a method for making a glass-ceramic, the method comprising heat-treating glass according to the present invention to convert at least a portion of the glass to crystalline ceramic and provide glass-ceramic (i.e., at least a portion of the glass crystallizes). In another aspect, the present invention provides a method for making glass-ceramic according to the present invention, the method comprising heat-treating ceramic comprising glass according to the present invention to convert at least a portion of the glass to glass-ceramic (i.e., convert at least a portion of the glass to crystalline ceramic).

In another aspect, the present invention provides a method for making a glass-ceramic article. In one exemplary method, the method comprises:

providing glass beads, the glass according to the present invention, the glass having a $T_g$;

heating the glass beads above the $T_g$ such that the glass beads coalesce to form a shape; and heat-treating the glass article to convert at least a portion of the glass to crystalline ceramic and provide the glass-ceramic article. Optionally, the coalesced glass is at least partially cooled before heat-treating.

In another exemplary method for making a glass-ceramic article, the method comprises:

providing glass powder (e.g., crushing glass (e.g., glass beads) to provide glass powder), the glass comprising glass according to the present invention, the glass having a $T_g$;

heating the glass powder above the $T_g$ such that the glass powder coalesces to form a shape; and heat-treating the glass article to convert at least a portion of the glass to crystalline ceramic provide the glass-ceramic article. Optionally, the coalesced glass is at least partially cooled before heat-treating.

Some embodiments of ceramics according to the present invention may comprise glass of the ceramic (e.g., the glass of a glass-ceramic) in an amount, for example, of at least 1, 2, 3, 5, 10, 15, 20, 25, 30, 35, 40, 45, 50, 55, 60, 65, 70, 75, 80, 85, 90, 95, or even 100 percent by volume, based on the total volume of the ceramic. Some embodiments of ceramics according to the present invention may comprise crystalline ceramic of the ceramic (e.g., the crystalline ceramic of the glass-ceramic) in an amount, for example, of at least 1, 2, 3, 5, 10, 15, 20, 25, 30, 35, 40, 45, 50, 55, 60, 65, 70, 75, 80, 85, 90, 95, 97, 98, 99, or even 100 percent by volume, based on the total volume of the ceramic.

Some embodiments of the present invention include ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic.

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramic comprising crystals formed by heat-treating glass;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium oxide (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium oxide (e.g., $Tb_2O_3$), thorium oxide (e.g., $Th_4O_7$), thulium oxide (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3$.metal oxide, etc.) is crystalline, for example, in a glass-ceramic, it may be glass, crystalline, or portions glass and portions crystalline. For example, if a glass-ceramic comprises $Al_2O_3$ and $ZrO_2$, the $Al_2O_3$ and $ZrO_2$ may each be in a glassy state, crystalline state, or portions in a glassy state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$.metal oxides.

Some embodiments of ceramics according to the present invention can be made, formed as, or converted into beads (e.g., beads having diameters of at least 1 micrometers, 5 micrometers, 10 micrometers, 25 micrometers, 50 micrometers, 100 micrometers, 150 micrometers, 250 micrometers, 500 micrometers, 750 micrometers, 1 mm, 5 mm, or even at least 10 mm), articles (e.g., plates), fibers, particles, and coatings (e.g., thin coatings). Embodiments of the beads can be useful, for example, in reflective devices such as retroreflective sheeting, alphanumeric plates, and pavement markings. Embodiments of the particles and fibers are useful, for example, as thermal insulation, filler, or reinforcing material in composites (e.g., ceramic, metal, or polymeric matrix composites). Embodiments of the thin coatings can be useful, for example, as protective coatings in applications involving wear, as well as for thermal management. Examples of articles according to the present invention include kitchenware (e.g., plates), dental brackets, and reinforcing materials (e.g., particles and fibers), cutting tool inserts, abrasive materials, and structural components of gas engines, (e.g., valves and bearings). Exemplary embodiments of other articles include those having a protective coating of ceramic on the outer surface of a body or other substrate. Certain ceramic particles according to the present invention can be particularly useful as abrasive particles. The abrasive particles can be incorporated into an abrasive article, or used in loose form.

Abrasive particles are usually graded to a given particle size distribution before use. Such distributions typically have a range of particle sizes, from coarse particles to fine particles. In the abrasive art this range is sometimes referred to as a "coarse", "control" and "fine" fractions. Abrasive particles graded according to abrasive industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles according to the present invention. In some embodiments, at least 5, 10, 15, 20, 25, 30, 35, 40, 45, 50, 55, 60, 65, 70, 75, 80, 85, 90, 95, or even 100 percent by weight of the plurality of abrasive particles are the abrasive particles according to the present invention, based on the total weight of the plurality of abrasive particles.

In another aspect, the present invention provides abrasive particles comprising a glass-ceramic according to the present invention (including glass-ceramic abrasive particles). The present invention also provides a plurality of abrasive particles having a specified nominal grade, wherein at least a portion of the plurality of abrasive particles are abrasive particle according to the present invention. In another aspect, the present invention provides an abrasive article (e.g., a bonded abrasive article, a non-woven abrasive article, or a coated abrasive article) comprising a binder and a plurality of abrasive particles, wherein at least a portion of the abrasive particles are the abrasive particles according to the present invention.

In another aspect, the present invention provides a method for making abrasive particles. In another exemplary method for making abrasive particles, the method comprises heat-treating glass particles according to the present invention, to convert at least a portion of the glass to crystalline ceramic and provide glass-ceramic and abrasive particles according to the present invention. In some embodiments, the method further comprises grading the abrasive particles according to the present invention to provide a plurality of abrasive particles having a specified nominal grade. In some embodiments, the glass particles to be heat-treated are provided as a plurality of particles having a specified nominal grade, and wherein at least a portion of the particles is a plurality of the glass particles.

In another exemplary method for making abrasive particles, the method comprises heat-treating particles comprising glass according to the present invention, to convert at least a portion of the glass to crystalline ceramic and provide glass-ceramic and abrasive particles according to the present invention. In some embodiments, the method further comprises grading the abrasive particles according to the present invention to provide a plurality of abrasive particles having a specified nominal grade. In some embodiments, the particles comprising glass to be heat-treated are provided as a plurality of particles having a specified nominal grade, and wherein at least a portion of the particles is a plurality of the particles comprising glass.

In another exemplary method for making abrasive particles, the method comprises heat-treating glass according to the present invention to convert at least a portion of the glass to crystalline ceramic and provide glass-ceramic and crushing the glass-ceramic to provide abrasive particles according to the present invention. In some embodiments, the method further comprises grading the abrasive particles according to the present invention to provide a plurality of abrasive particles having a specified nominal grade.

In another exemplary method for making abrasive particles, the method comprises heat-treating ceramic comprising glass according to the present invention to convert at least a portion of the glass to crystalline ceramic and provide glass-ceramic and crushing the glass-ceramic to provide abrasive particles according to the present invention. In some embodiments, the method further comprises grading the abrasive particles according to the present invention to provide a plurality of abrasive particles having a specified nominal grade.

Abrasive articles according to the present invention comprise binder and a plurality of abrasive particles, wherein at least a portion of the abrasive particles are the abrasive particles according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, at least 5, 10, 15, 20, 25, 30, 35, 40, 45, 50, 55, 60, 65, 70, 75, 80, 85, 90, 95, or even 100 percent by weight of the abrasive particles in an abrasive article are the abrasive particles according to the present invention, based on the total weight of the abrasive particles in the abrasive article.

The present invention also provides a method of abrading a surface, the method comprising:
contacting abrasive particles according to the present invention with a surface of a workpiece; and
moving at least one of the abrasive particles according to the present invention or the contacted surface to abrade at least a portion of the surface with at least one of the abrasive particles according to the present invention.

DETAILED DESCRIPTION

Figure 1:
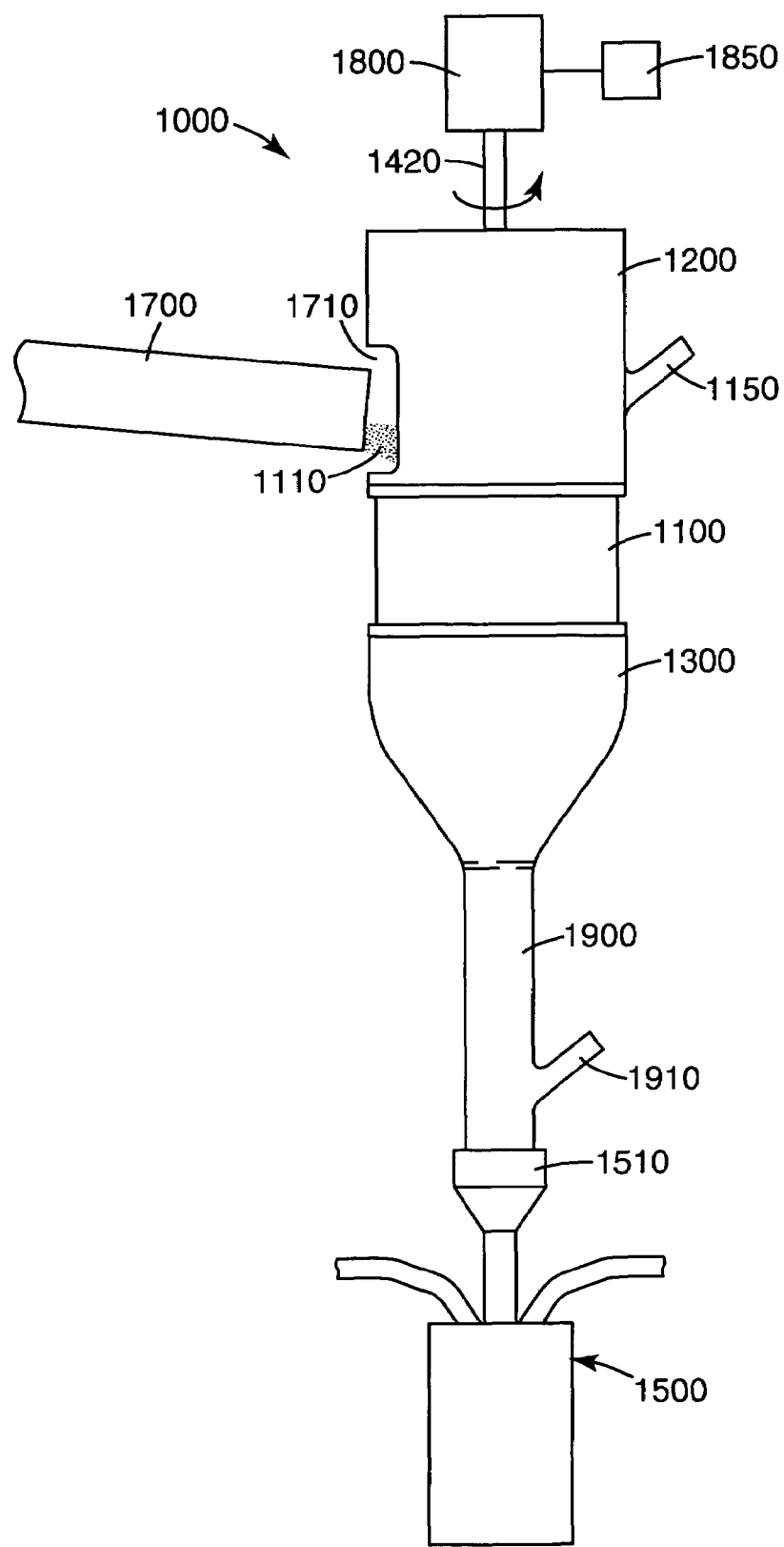
FIG. 1 is a side view of an exemplary embodiment of an apparatus including a powder feeder assembly for a flame-melting apparatus.
Figure 2:
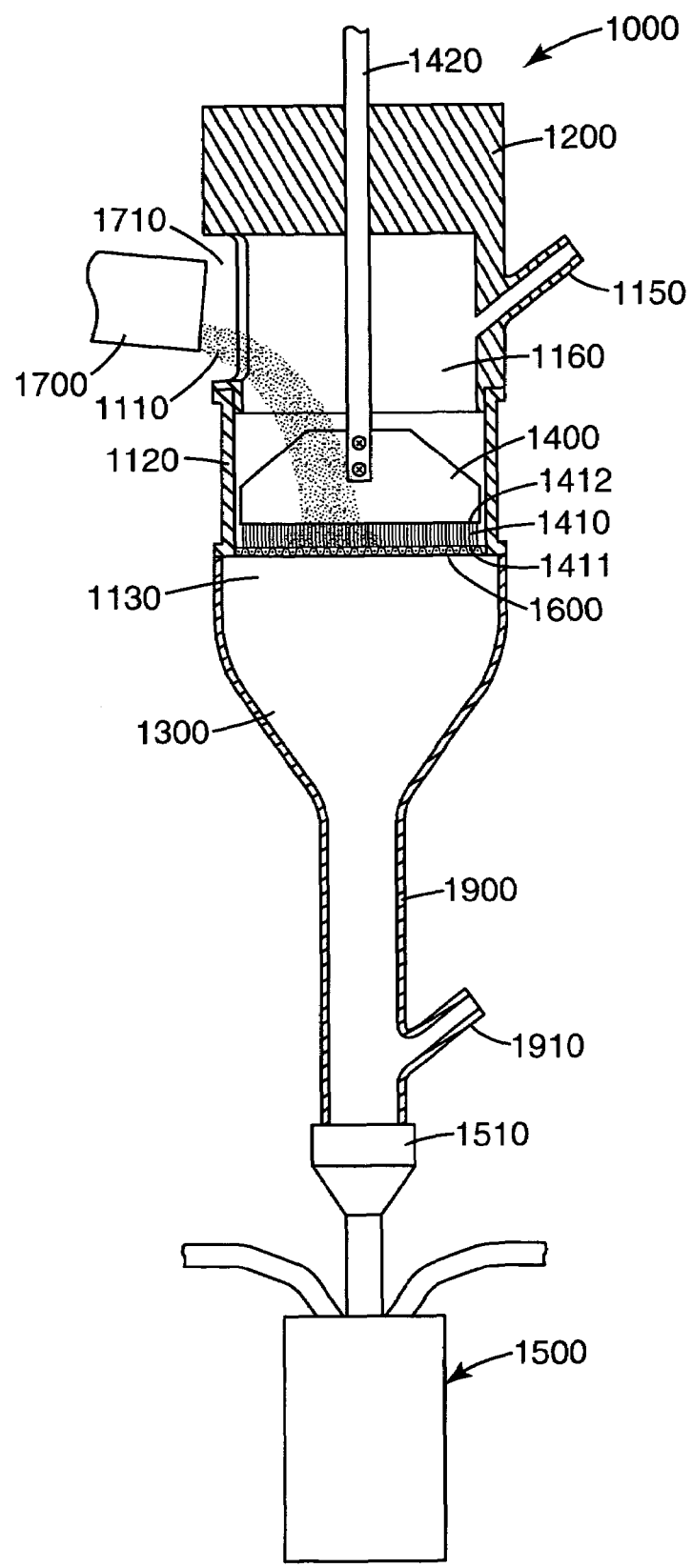
FIG. 2 is a section view of the apparatus of FIG. 1.

The present invention pertains to glasses and glass-ceramics comprising nitrogen, and methods for making the same. The glasses are prepared by selecting the necessary raw materials and processing techniques.

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. The $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

Commercially available sources of metal nitrides (e.g., AlN) include powders, metal oxynitride (e.g., aluminum oxynitride) (e.g., AlON) powders, and ores comprised, for example, of at least one of metal (e.g., aluminum) nitride and/or at least one other metal other than Al. Other materials containing nitrogen (e.g., nitrogen gas (e.g., nitrogen gas may be injected into the melt)) may also be used as a raw material.

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). The rare earth oxide(s) source may contain, or provide rare earth oxide(s), as well as one or more metal oxides other than rare earth oxide(s) (including materials of or containing complex rare earth oxide other metal oxides (e.g., $Dy_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. The $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Other useful metal oxide may also include, on a theoretical oxide basis, $BaO$, $CaO$, $Cr_2O_3$, $CoO$, $CuO$, $Fe_2O_3$, $GeO_2$, $HfO_2$, $Li_2O$, $MgO$, $MnO$, $NiO$, $Na_2O$, $Sc_2O_3$, $SrO$, $TiO_2$, $ZnO$, $ZrO_2$, and combinations thereof. Sources, including commercial sources, include the oxides themselves, metal powders, complex oxides, ores, carbonates, acetates, nitrates, chlorides, hydroxides, etc. These metal oxides are added to modify a physical property of the resulting ceramic and/or improve processing. These metal oxides are typically are added anywhere from 0 to 50% by weight, in some embodiments, 0 to 25% by weight, or even, 0 to 50% by weight of the ceramic material depending, for example, upon the desired property.

For embodiments comprising $ZrO_2$ and $HfO_2$, the weight ratio of $ZrO_2$:$HfO_2$ may be in a range of 1:zero (i.e., all $ZrO_2$; no $HfO_2$) to zero:1, as well as, for example, at least about 99, 98, 97, 96, 95, 90, 85, 80, 75, 70, 65, 60, 55, 50, 45, 40, 35, 30, 25, 20, 15, 10, and 5 parts (by weight) $ZrO_2$ and a corresponding amount of $HfO_2$ (e.g., at least about 99 parts (by weight) $ZrO_2$ and not greater than about 1 part $HfO_2$) and at least about 99, 98, 97, 96, 95, 90, 85, 80, 75, 70, 65, 60, 55, 50, 45, 40, 35, 30, 25, 20, 15, 10, and 5 parts $HfO_2$ and a corresponding amount of $ZrO_2$.

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

In some embodiments, it may be advantageous for at least a portion of a metal oxide source (in some embodiments, 10, 15, 20, 25, 30, 35, 40, 45, 50, 55, 60, 65, 70, 75, 80, 85, 90, 95, or even 100 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise combining them with the other raw materials. Although not wanting to be bound by theory, it is believed that the heat resulting from the exothermic reaction associated with the oxidation of the metal is beneficial in the formation of a homogeneous melt and resulting glass. For example, it is believed that the additional heat generated by the oxidation reaction within the raw material eliminates, minimizes, or at least reduces insufficient heat transfer, and hence facilitates formation and homogeneity of the melt, particularly when forming glass particles with x, y, and z dimensions over 50 (over 100, or even over 150) micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or not practical due to high melting point of the materials. Further, the presence of the additional heat generated by the oxidation reaction actually enables the formation of glass that otherwise could not be made, or could not be made in the desired size range. Another advantage of the invention includes, in forming the glasses, that many of the chemical and physical processes such as melting, densification and spherodizing can be achieved in a short time, so that very high quench rates may be achieved. For additional details, see co-pending application having U.S. Ser. No. 10/211,639, filed the Aug. 2, 2002.

In some embodiments, for example, the raw materials are fed independently to form the molten mixture. In some embodiments, for example, certain raw materials are mixed together, while other raw materials are added independently into the molten mixture. In some embodiments, for example, the raw materials are combined or mixed together prior to melting. The raw materials may be combined, for example, in any suitable and known manner to form a substantially homogeneous mixture. These combining techniques include ball milling, mixing, tumbling, and the like. The milling media in the ball mill may be metal balls, ceramic balls, and the like. The ceramic milling media may be, for example, alumina, zirconia, silica, magnesia and the like. The ball milling may occur dry, in an aqueous environment, or in a solvent-based (e.g., isopropyl alcohol) environment. If the raw material batch contains metal powders, then it is generally desired to use a solvent during milling. This solvent may be any suitable material with the appropriate flash point and ability to disperse the raw materials. The milling time may be from a few minutes to a few days, generally between a few hours to 24 hours. In a wet or solvent based milling system, the liquid medium is removed, typically by drying, so that the resulting mixture is typically homogeneous and substantially devoid of the water and/or solvent. If a solvent based milling system is used, during drying, a solvent recovery system may be employed to recycle the solvent. After drying, the resulting mixture may be in the form of a "dried cake". This cake-like mixture may then be broken up or crushed into the desired particle size prior to melting. Alternatively, for example, spray-drying techniques may be used. The latter typically provides spherical particulates of a desired mixture. The precursor material may also be prepared by wet chemical methods including precipitation and sol-gel. Such methods will be beneficial if extremely high levels of homogeneity are desired.

Particulate raw materials are typically selected to have particle sizes such that the formation of a homogeneous melt can be achieved rapidly. Typically, raw materials with relatively small average particle sizes and narrow distributions are used for this purpose. In some methods (e.g., flame forming and plasma spraying), particularly desirable particulate raw materials are those having an average particle size in a range from about 5 nm to about 50 micrometers (in some embodiments, in a range from about 10 nm to about 20 micrometers, or even about 15 nm to about 1 micrometer), wherein at least 90 (in some embodiments, 95, or even 100) percent by weight of the particulate is the raw material, although sizes outside of the sizes and ranges may also be useful. Particulate less than about 5 nm in size tends to be difficult to handle (e.g., the flow properties of the feed particles tended to be undesirable as they tend to have poor flow properties). Use of particulate larger than about 50 micrometers in typical flame forming or plasma spraying processes tend to make it more difficult to obtain homogenous melts and glasses and/or the desired composition.

Furthermore, in some cases, for example, when particulate material is fed in to a flame or thermal or plasma spray apparatus, to form the melt, it may be desirable for the particulate raw materials to be provided in a range of particle sizes. Although not wanting to be bound by theory, it is believed that this facilitates the packing density and strength of the feed particles. In general, the coarsest raw material particles should be smaller than the desired melt or glass particle sizes. Further, raw material particles that are too coarse, tend to have insufficient thermal and mechanical stresses in the feed particles, for example, during a flame forming or plasma spraying step. The end result in such cases is generally fracturing of the feed particles in to smaller fragments, loss of compositional uniformity, loss of yield in desired glass particle sizes, or even incomplete melting as the fragments generally change their trajectories in a multitude of directions out of the heat source.

The glasses and ceramics comprising glass can be made, for example, by heating (including in a flame or plasma) the appropriate metal oxide sources and N source (e.g., metal nitride (e.g., AlN), metal oxynitride (e.g., aluminum oxynitride), and the like (e.g., various combinations of nitrides and oxynitrides can be utilized as source for nitrogen); further, metal oxynitrides can be used as both source of N, as well O) (and/or otherwise provide the N in the melt (e.g., injecting nitrogen gas into the melt) to form a melt, desirably a homogenous melt, and then rapidly cooling the melt to provide glass. Some embodiments of glasses can be made, for example, by melting the metal oxide sources in any suitable furnace (e.g., an inductively or resistively heated furnace, a gas-fired furnace, or an electric arc furnace).

The glass is typically obtained by relatively rapidly cooling the molten material (i.e., the melt). The quench rate (i.e., the cooling time) to obtain the glass depends upon many factors, including the chemical composition of the melt, the glass-forming ability of the components, the thermal properties of the melt and the resulting glass, the processing technique(s), the dimensions and mass of the resulting glass, and the cooling technique. In general, relatively higher quench rates are required to form glasses comprising higher amounts of $Al_2O_3$ (i.e., greater than 75 percent by weight $Al_2O_3$), especially in the absence of known glass formers such as $SiO_2$, $Bi_2O_3$, $B_2O_3$, $P_2O_5$, $GeO_2$, $TeO_2$, $As_2O_3$, and $V_2O_5$. Similarly, it is more difficult to cool melts into glasses in larger dimensions, as it is more difficult to remove heat fast enough.

In some embodiments of the invention, the raw materials are heated into a molten state in a particulate form and subsequently cooled into glass particles. Typically, the particles have a particle size greater than 25 micrometers (in some embodiments, greater than 50, 100, 150, or even 200 micrometers).

The quench rates achieved in making glasses according to the methods of the present invention are believed to be higher than $10^2$, $10^3$, $10^4$, $10^5$ or even $10^{6\circ}$ C./sec (i.e., a temperature drop of 1000° C. from a molten state in less than 10 seconds, less than a second, less than a tenth of a second, less than a hundredth of a second or even less than a thousandth of a second, respectively). Techniques for cooling the melt include discharging the melt into a cooling media (e.g., high velocity air jets, liquids (e.g., cold water), metal plates (including chilled metal plates), metal rolls (including chilled metal rolls), metal balls (including chilled metal balls), and the like). Other cooling techniques known in the art include roll-chilling. Roll-chilling can be carried out, for example, by melting the metal oxide sources at a temperature typically 20-200° C. higher than the melting point, and cooling/quenching the melt by spraying it under high pressure (e.g., using a gas such as air, argon, nitrogen or the like) onto a high-speed rotary roll(s). Typically, the rolls are made of metal and are water-cooled. Metal book molds may also be useful for cooling/quenching the melt.

The cooling rate is believed to affect the properties of the quenched glass. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence glass formation by influencing crystallization kinetics from undercooled liquid. For example, larger undercooling of $Al_2O_3$ melts without crystallization has been reported in argon atmosphere as compared to that in air. Also see, for example, copending application having U.S. Ser. No. 10/901,638, filed the same date as the instant application, the disclosure of which is incorporated herein by reference.

In one method, glasses and ceramics comprising glass according to the present invention can be made utilizing flame fusion as reported, for example, in U.S. Pat. No. 6,254,981 (Castle). In this method, the metal oxide source(s) and N source(s) are fed (e.g., in the form of particles, sometimes referred to as "feed particles") directly into a burner (e.g., a methane-air burner, an acetylene-oxygen burner, a hydrogen-oxygen burner, and the like), and then quenched, for example, in water, cooling oil, air, or the like. Feed particles can be formed, for example, by grinding, agglomerating (e.g., spray-drying), melting, or sintering the metal oxide sources and/or N source(s). The size of feed particles fed into the flame generally determines the size of the resulting particles comprising glass.

Some embodiments of glasses can also be obtained by other techniques, such as: laser spining melt with free fall cooling, Taylor wire technique, plasmatron technique, hammer and anvil technique, centrifugal quenching, air gun splat cooling, single roller and twin roller quenching, roller-plate quenching, and pendant drop melt extraction (see, e.g., *Rapid Solidification of Ceramics*, Brockway et al., Metals And Ceramics Information Center, A Department of Defense Information Analysis Center, Columbus, Ohio, January, 1984). Some embodiments of glasses may also be obtained by other techniques, such as: thermal (including flame or laser or plasma-assisted) pyrolysis of suitable precursors, physical vapor synthesis (PVS) of metal precursors and mechanochemical processing. Other techniques for forming melts, cooling/quenching melts, and/or otherwise forming glass include vapor phase quenching, plasma spraying, melt-extraction, and gas or centrifugal atomization. Vapor phase quenching can be carried out, for example, by sputtering, wherein the metal alloys or metal oxide sources are formed into a sputtering target(s). The target is fixed at a predetermined position in a sputtering apparatus, and a substrate(s) to be coated is placed at a position opposing the target(s). A typical pressures of $10^{-3}$ torr of oxygen gas and Ar gas, a discharge is generated between the target(s) and substrate(s), and Ar or oxygen ions collide against the target to cause reaction sputtering, thereby depositing a film of composition on the substrate. For additional details regarding plasma spraying, see, for example, co-pending application having U.S. Ser. No. 10/211,640, filed Aug. 2, 2003.

Gas atomization involves heating feed particles to convert them to melt. A thin stream of such melt is atomized through contact with a disruptive air jet (i.e., the stream is divided into fine droplets). The resulting substantially discrete, generally ellipsoidal glass particles (e.g., beads) are then recovered. Examples of bead sizes include those having a diameter in a range of about 5 micrometers to about 3 mm. Melt-extraction can be carried out, for example, as reported in U.S. Pat. No. 5,605,870 (Strom-Olsen et al.). Containerless glass forming techniques utilizing laser beam heating as reported, for example, in U.S. Pat. No. 6,482,758 (Weber), may also be useful in making glass according to the present invention.

An exemplary powder feeder apparatus is illustrated in FIGS. 1-6. The powder feeder assembly 1000 holds and delivers powder 1110 to a flame-melting device 1500. The flame-melting device 1500 includes a powder receiving section 1510 for receiving powder 1110 for melting and transforming into another material(s), such as those disclosed herein. Powder 1110 is delivered into the powder receiving section 1510 through a discharge opening 1130 of the powder feeder assembly 1000. A connecting tube 1900 is positioned between the discharge opening 1130 and the powder receiving section 1510. Also, a funnel 1300 is positioned proximate to the discharge opening 1130 for receiving and directing powder 1110 flow after it leaves the discharge opening 1130.

Figure 6:
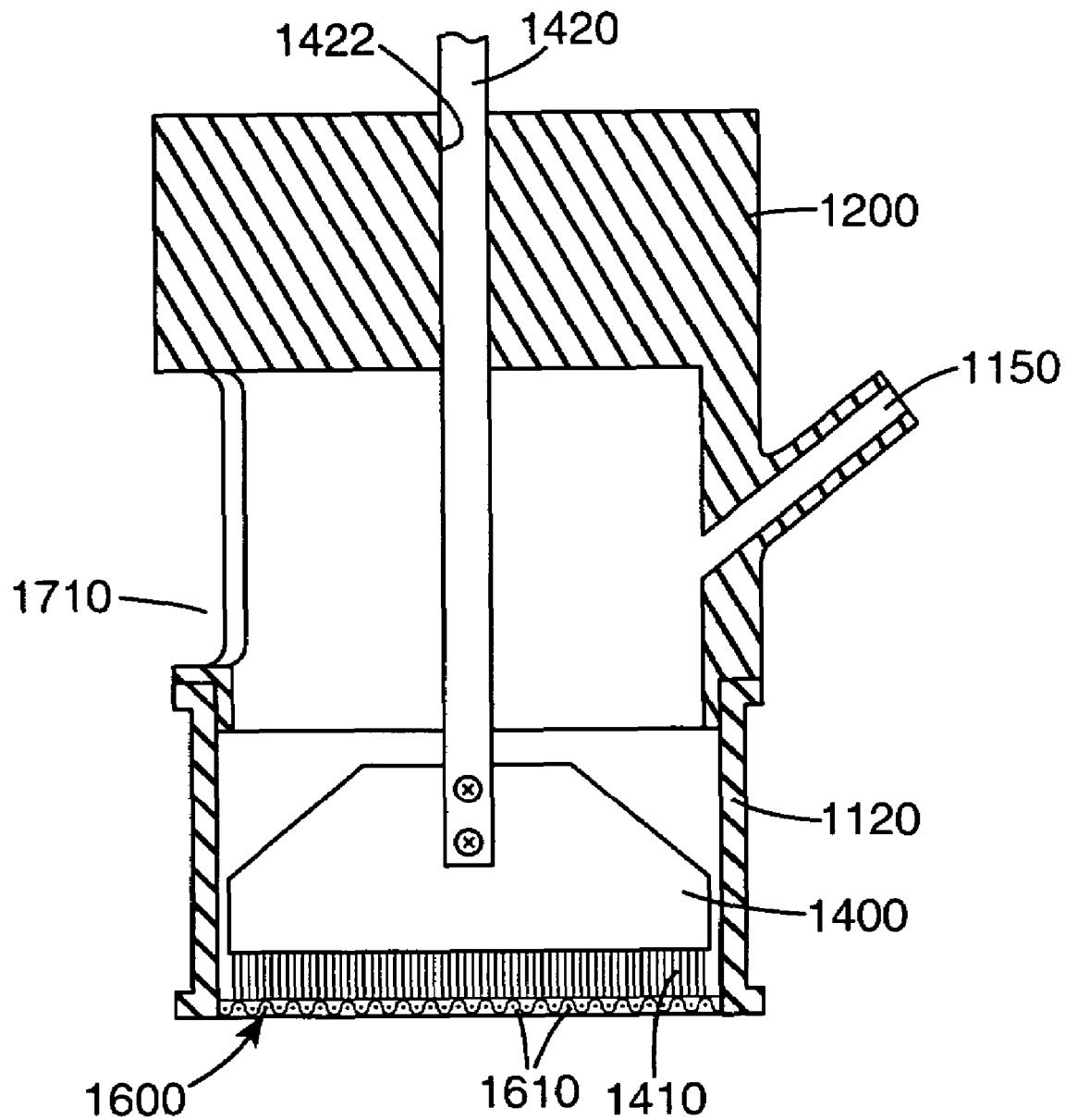
FIG. 6 is a cross-sectional view of a portion of the powder feeder assembly of FIG. 1.

The powder feeder assembly 1000 includes a hopper 1100 for holding powder 1110. Typically, the hopper 1100 includes a body 1120 defined by a cylindrical wall, though other body shapes are possible. Also, the hopper 1100 can be made from a unitary piece or multiple pieces. The hopper 1100 in the example embodiment illustrated also includes a cover section 1200. The cover section 1200 includes an opening 1710 for feeding powder 1110 into the hopper 1100. Any commercially available delivery means can be used for filling the hopper 1100 with powder 1110, such as a screw feeder, vibratory feeder, or brush feeder. The cover section 1200 can also include a section having a shaft receiving opening 1422 (as illustrated in FIG. 6).

A brush assembly 1400 is disposed within the hopper 1100 body 1120. The brush assembly 1400 is connected to means for rotating the brush assembly 1400, such as a motor 1800. The motor 1800 can also be connected to means for adjusting the speed of the motor 1800, such as a motor speed controller 1850. The brush assembly used was a Nylon Strip Brush (1 inch (2.5 cm) overall height, 5/16 inch (0.8 cm) bristle length and 0.02 inch (5 millimeter) diameter), part# 74715T61, available from McMaster-Carr, Chicago, Ill. The brush assembly was coupled to a shaft, which in turn was coupled to and driven by a DC Gear Motor (130 Volt, Ratio 60:1, Torque 22 Lb-in), available from Bodine Electric Company, Chicago, Ill. The speed of the motor was controlled using a Type-FPM Adjustable Speed PM Motor Control, Model # 818, also available from Bodine.

The brush assembly 1400 includes a bristle element 1410 having a distal 1411 and a proximate end 1412. When powder 1110 is placed into the hopper 1100 for delivery to the flame-melting device 1500, the brush assembly 1400 is rotated within the hopper 1100. When the brush assembly 1400 is rotated, the, the bristle element(s) 1410 urges powder 1110 in the hopper 1100 through a screening member 1600. By adjusting the rotational speed of the brush assembly 1400, the feed rate of the powder 1110 through the screening member 1600 can be controlled.

The brush assembly 1400 cooperates with the screening member 1600 to deliver powder 1110 having desired properties from the discharge opening 1130 to the powder receiving section 1510 of the flame-melting device 1500. Distal end 1411 of bristle 1410 is located in close proximity to the screening member 1600. While a small gap between distal end 1411 of bristles 1410 and screening member 1600 can be used, it is typical to keep the gap on the same order of magnitude as the particle size of the powder, however, one of ordinary skill in the art will appreciate that the gap can be much larger, depending on the particular properties of the powder being handled. Also, distal end 1411 of bristle 1410 can be positioned flush with screening member 1600 or positioned to protrude into and extend through the mesh openings 1610 in the screening member 1600. For the bristles 1410 to protrude through the openings 1610, at least some of the bristles 1410 need to have a diameter smaller than the mesh size. Bristle elements 1410 can include a combination of bristles with different diameters and lengths, and any particular combination will depend on the operating conditions desired.

Extending the bristle 1400 end 1411 into and through the openings 1610 allows the bristles 1410 to break up any particles forming bridges across openings 1610. Also the bristles 1410 will tend to break-up other types of blockages that can occur typical to powder feeding. The bristle element 1410 can be a unitary piece, or can also be formed from a plurality of bristle segments. Also, if it is desired that the bristle elements extend into and/or through the mesh openings, then the bristle 1410 size selected needs to be smaller than the smallest mesh opening 1610.

Figure 3:
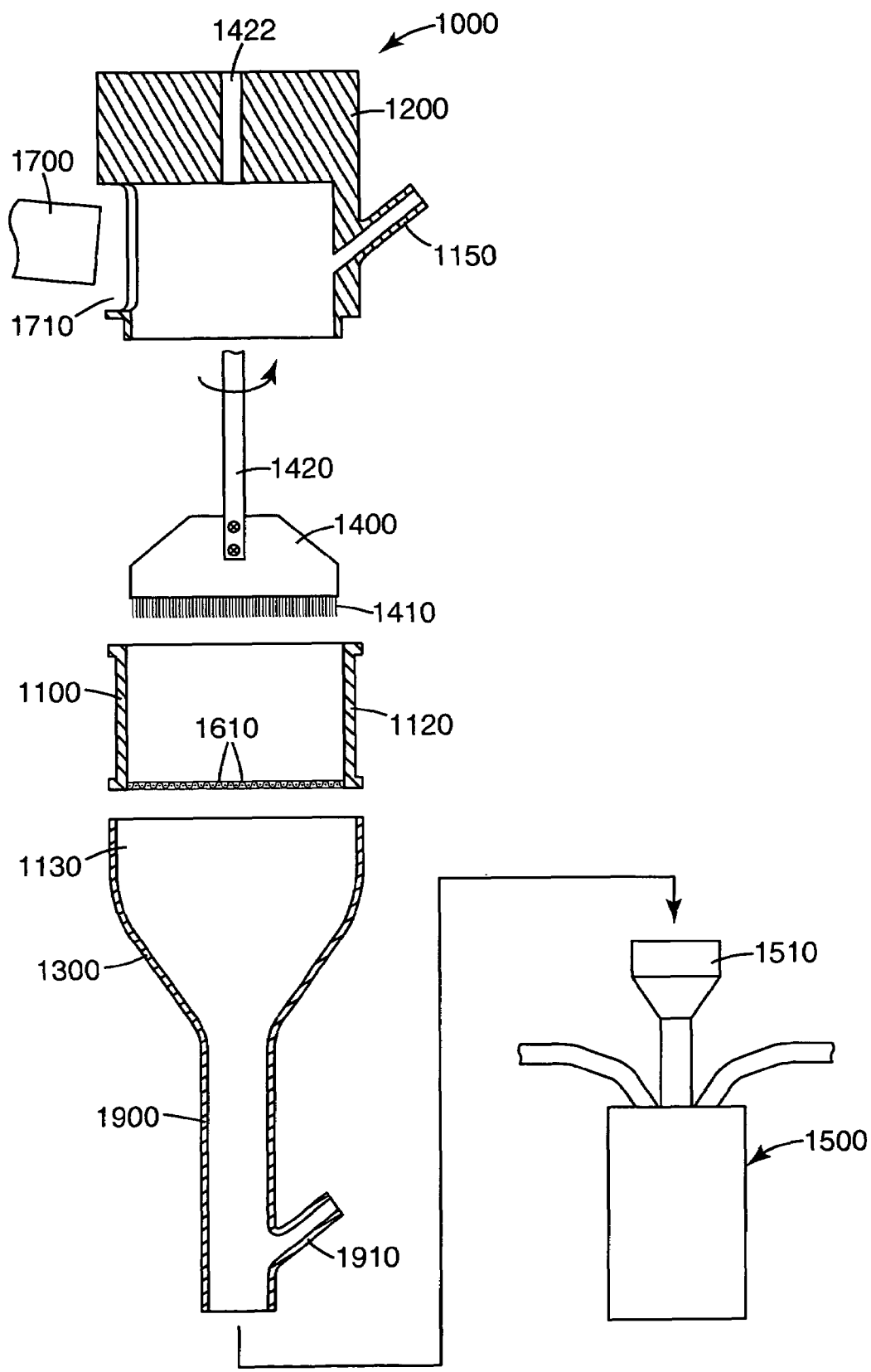
FIG. 3 is an exploded section view of the apparatus of FIG. 1.
Figures 4, 5:
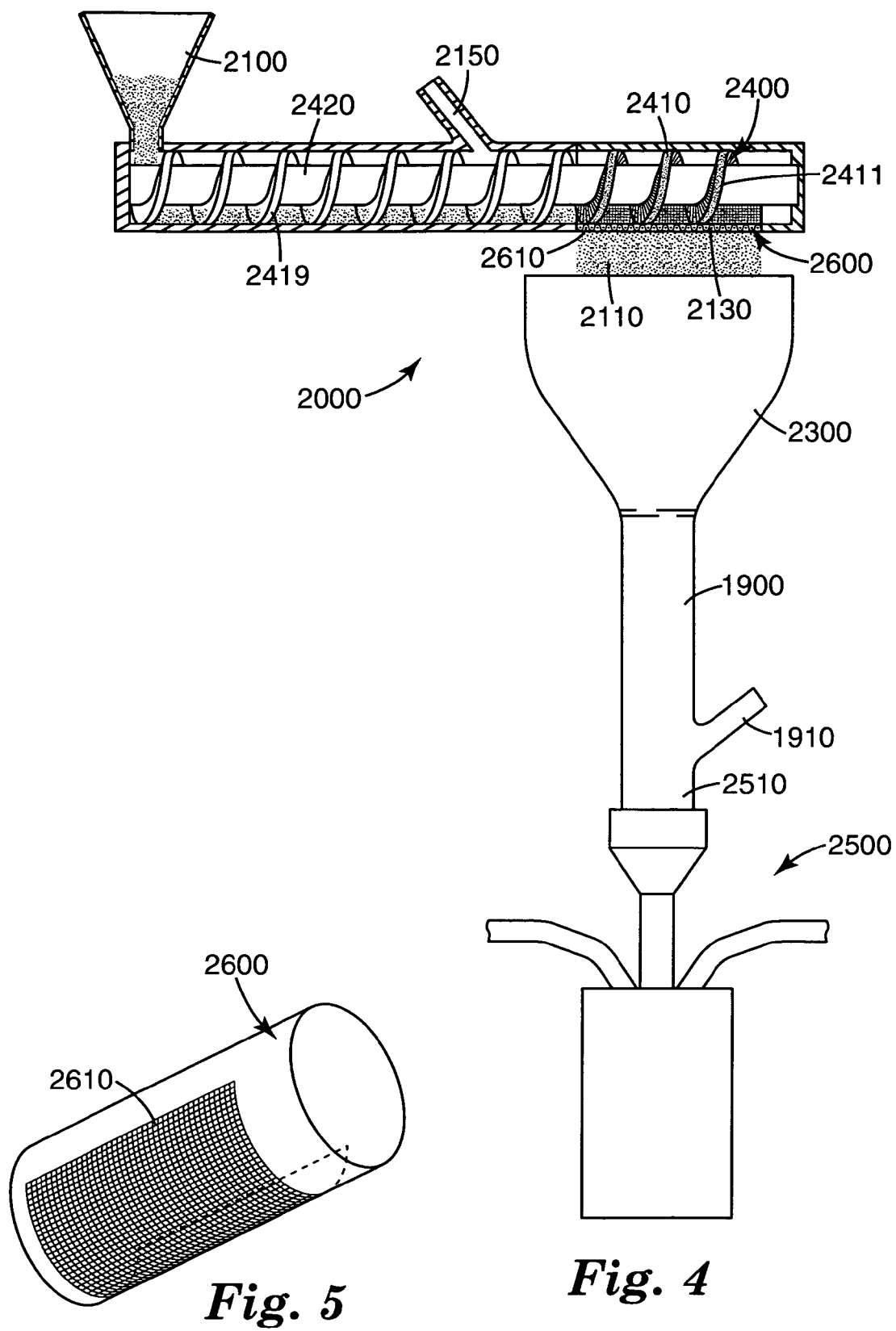
FIG. 4 is a side view of a portion of the powder feeder assembly of FIG. 1.
FIG. 5 is a perspective view of a portion of the powder feeder assembly of FIG. 1.

Referring to FIG. 3, in the exemplary embodiment illustrated, the hopper 1100 can include a wall defining a cylindrical body 1120. This shape conveniently provides for symmetry that allows for a more controlled flow rate of powder from the discharge opening 1130. Also, the cylindrical shape is well suited for using with a rotating brush assembly 1400, since the bristle element 1410 can extend to the wall, leaving little or no area on the screening member that can accumulate powder. However, other geometries are possible, as the particular conditions of use dictate.

The hopper 1100 also includes a cover section 1200. The cover section 1200 has an opening 1710 for receiving powder 1110 from a hopper feeder assembly 1700. The cover section 1200 cooperates with the body 1120 to form a powder chamber 1160. The opening 1710 on the cover 1200 can also be omitted or sealable so that a gas, such as nitrogen, argon, or helium can be input into a gas input line 1150 on the hopper 1100 for neutralizing the atmosphere or assisting in delivering the powder or particles to the flame-melting device. Also, gas can be used in the system for controlling the atmosphere surrounding the powder or particles. Also, a gas input line 1910 can be placed after the discharge opening 1130, for example, on the connecting tube 1900.

The entire powder feeder assembly 1000 can be vibrated to further assist in powder transport. Optionally, the screening member can be vibrated to assist powder transport through the powder feeder assembly 1000. One of ordinary skill in the art will recognize that other possible vibrating means can be used, and there are abundant commercial vibrating systems and devices that are available depending on the particular conditions of use.

Referring to FIG. 6, when hopper 1100 includes a cover 1200 and a body 1120, the removable cover 1200 allows easy access to powder chamber 1160 for cleaning or changing the screening member 1600. Also, the brush assembly 1400 can be positioned to form the desired engagement between the bristle elements 1410 and the screening member 1600. When the brush assembly 1400 is attached to a rotating shaft 1420, the shaft 1420 can protrude outside opening 1422 in the cover 1200 to be driven, for example, by a motor 1800. The speed of the brush assembly 1400 can be controlled by means such as a speed controller 1850. Further details regarding this exemplary powder feeding apparatus can be found in co-pending application having U.S. Ser. No. 10/739,233, filed Dec. 18, 2003, the disclosure of which is incorporated herein by reference.

Typically, glasses and the glass-ceramics according to the present invention have x, y, and z dimensions each perpendicular to each other, and wherein each of the x, y, and z dimensions are at least 10 micrometers. In some embodiments, the x, y, and z dimensions are at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 5 mm, or even at least 10 mm, if coalesced. The x, y, and z dimensions of a material are determined either visually or using microscopy, depending on the magnitude of the dimensions. The reported z dimension is, for example, the diameter of a sphere, the thickness of a coating, or the narrowest dimension of a prismatic shape.

The addition of certain metal oxides may alter the properties and/or crystalline structure or microstructure of ceramics according to the present invention, as well as the processing of the raw materials and intermediates in making the ceramic. For example, oxide additions such as MgO, CaO, $Li_2O$, and $Na_2O$ have been observed to alter both the $T_g$ and $T_x$ (wherein $T_x$ is the crystallization temperature) of glass. Although not wishing to be bound by theory, it is believed that such additions influence glass formation. Further, for example, such oxide additions may decrease the melting temperature of the overall system (i.e., drive the system toward lower melting eutectic), and ease glass formation. Compositions based upon complex eutectics in multi-component systems (quaternary, etc.) may have better glass-forming ability. The viscosity of the liquid melt and viscosity of the glass in its' working range may also be affected by the addition of metal oxides other than the particular required oxide(s).

Crystallization of glasses and ceramics comprising the glass to form glass-ceramics may also be affected by the additions of materials. For example, certain metals, metal oxides (e.g., titanates and zirconates), and fluorides may act as nucleation agents resulting in beneficial heterogeneous nucleation of crystals. Also, addition of some oxides may change the nature of metastable phases devitrifying from the glass upon reheating. In another aspect, for ceramics according to the present invention comprising crystalline $ZrO_2$, it may be desirable to add metal oxides (e.g., $Y_2O_3$, $TiO_2$, $CeO_2$, CaO, and MgO) that are known to stabilize the tetragonal/cubic form of $ZrO_2$.

The particular selection of metal oxide sources and other additives for making ceramics according to the present invention typically takes into account, for example, the desired composition, the microstructure, the degree of crystallinity, the physical properties (e.g., hardness or toughness), the presence of undesirable impurities, and the desired or required characteristics of the particular process (including equipment and any purification of the raw materials before and/or during fusion and/or solidification) being used to prepare the ceramics.

In some instances, it may be preferred to incorporate limited amounts of metal oxides selected from the group consisting of: $B_2O_3$, $Bi_2O_3$, $Na_2O$, $P_2O_5$, $SiO_2$, $TeO_2$, $V_2O_5$, and combinations thereof. Sources, including commercial sources, include the oxides themselves, complex oxides, elemental (e.g., Si) powders, ores, carbonates, acetates, nitrates, chlorides, hydroxides, etc. These metal oxides may be added, for example, to modify a physical property of the resulting glass-ceramic and/or improve processing. These metal oxides, when used, are typically added from greater than 0 to 20% by weight collectively (in some embodiments, greater than 0 to 5% by weight collectively, or even greater than 0 to 2% by weight collectively) of the glass-ceramic depending, for example, upon the desired property.

Useful formulations include those at or near a eutectic composition(s) (e.g., ternary eutectic compositions). In addition to compositions disclosed herein, other such compositions, including quaternary and other higher order eutectic compositions, may be apparent to those skilled in the art after reviewing the present disclosure.

The microstructure or phase composition (glassy/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous (or glass) yield can be calculated for particles (e.g., beads), etc. using a −100+120 mesh size fraction (i.e., the fraction collected between 150-micrometer opening size and 125-micrometer opening size screens). The measurements are done in the following manner. A single layer of particles, beads, etc. is spread out upon a glass slide. The particles, beads, etc. are observed using an optical microscope. Using the crosshairs in the optical microscope eyepiece as a guide, particles, beads, etc. that lay along a straight line are counted either amorphous or crystalline depending on their optical clarity (i.e., amorphous if they were clear). A total of 500 particles, beads, etc. are typically counted, although fewer particles, beads, etc. may be used and a percent amorphous yield is determined by the amount of amorphous particles, beads, etc. divided by total particles, beads, etc. counted. Embodiments of methods according to the present invention have percent amorphous (or glass) yields of at least 50, 60, 70, 75, 80, 85, 90, 95, or even 100 percent.

If it is desired for all the particles to be amorphous (or glass), and the resulting yield is less than 100%, the amorphous (or glass) particles may be separated from the non-amorphous (or non-glass) particles. Such separation may be done, for example, by any conventional techniques, including separating based upon density or optical clarity.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K $\alpha$1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, XRD can be used qualitatively to determine types of phases. The presence of a broad diffuse intensity peak is taken as an indication of the amorphous nature of a material. The existence of both a broad peak and well-defined peaks is taken as an indication of existence of crystalline matter within a glass matrix.

The initially formed glass or ceramic (including glass prior to crystallization) may be larger in size than that desired. If the glass is in a desired geometric shape and/or size, size reduction is typically not needed. The glass or ceramic can be converted into smaller pieces using crushing and/or comminuting techniques known in the art, including roll crushing, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are not of the desired size may be re-crushed if they are too large, or "recycled" and used as a raw material for re-melting if they are too small.

The shape of particles can depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For some particles an average aspect ratio ranging from 1:1 to 5:1 is typically desired, and in some embodiments, 1.25:1 to 3:1, or even 1.5:1 to 2.5:1.

It is also within the scope of the present invention, for example, to directly form articles in desired shapes. For example, desired articles may be formed (including molded) by pouring or forming the melt into a mold. Also see, for example, the forming techniques described in copending application having U.S. Ser. No. 10/358,772, filed Feb. 5, 2003.

Embodiments of ceramics according to the present invention can be obtained without limitations in dimensions. This was found to be possible through a coalescing step performed at temperatures above glass transition temperature. This coalescing step in essence forms a larger sized body from two or more smaller particles. For instance, glass according to the present invention undergoes glass transition ($T_g$) before significant crystallization occurs ($T_x$) as evidenced by the existence of an endotherm ($T_g$) at lower temperature than an exotherm ($T_x$). For example, ceramic (including glass prior to crystallization), may also be provided by heating, for example, particles comprising the glass, and/or fibers, etc. above the $T_g$ such that the particles, etc. coalesce to form a shape. The temperature and pressure used for coalescing may depend, for example, upon composition of the glass and the desired density of the resulting material. The temperature should be greater than the glass transition temperature. In certain embodiments, the heating is conducted at at least one temperature in a range of about 850° C. to about 1100° C. (in some embodiments, 900° C. to 1000° C.). Typically, the glass is under pressure (e.g., greater than zero to 1 GPa or more) during coalescence to aid the coalescence of the glass. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressing, hot extrusion, hot forging and the like (e.g., sintering, plasma assisted sintering). For example, particles comprising glass (obtained, for example, by crushing) (including beads and microspheres), fibers, etc. may formed into a larger particle size. Coalescing may also result in a body shaped into a desired form (e.g., a geometric shape). In some embodiments, the shaped body is a rod having an aspect ratio greater than 1:1, or even greater than 2:1. In some embodiments, it is desirable to cool the resulting coalesced body before further heat treatment. After heat treatment if so desired, the coalesced body may be crushed to smaller particle sizes or a desired particle size distribution.

Coalescing of the glass and/or glass-ceramic (e.g., particles) may also be accomplished by a variety of methods, including pressure-less or pressure sintering, forging, hot extrusion, etc.).

In some embodiments, coalescing of the glass can be conducted in a gaseous atmosphere (e.g., nitrogen) at a pressure greater than 1.1 atm. (in some embodiments, at a pressure greater than 1.25 atm., 1.5 atm., 2 atm., 5 atm., or even greater than 10 atm.) sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. (in some embodiments, at a pressure greater than 1.25 atm., 1.5 atm., 2 atm., 5 atm., or even greater than 10 atm.) is in direct contact with at least a portion of the outer surface of at least a portion the glass being consolidated (see, for example, copending application having U.S. Ser. No. 10/901,638, filed the same date as the instant application, the disclosure of which is incorporated herein by reference). In some embodiments, a nitrogen-containing gaseous atmosphere may serve as a source of nitrogen to the glass (i.e., may introduce nitrogen into the glass).

In general, heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment (or a portion thereof) can be conducted continuously, for example, using a rotary kiln, fluidized bed furnaces, or pendulum kiln. In the case of a rotary kiln or a pendulum kiln, the material is typically fed directly into the kiln operating at the elevated temperature. In the case of a fluidized bed furnace, the glass to be heat-treated is typically suspended in a gas (e.g., air, inert, or reducing gasses). The time at the elevated temperature may range from a few seconds (in some embodiments, even less than 5 seconds) to a few minutes to several hours. The temperature typically ranges from the $T_x$ of the glass to 1600° C., more typically from 900° C. to 1600° C., and in some embodiments, from 1200° C. to 1500° C. It is also within the scope of the present invention to perform some of the heat-treatment in multiple steps (e.g., one for nucleation, and another for crystal growth; wherein densification also typically occurs during the crystal growth step). When a multiple step heat-treatment is carried out, it is typically desired to control either or both the nucleation and the crystal growth rates. In general, during most ceramic processing operations, it is desired to obtain maximum densification without significant crystal growth. Although not wanting to be bound by theory, in general, it is believed in the ceramic art that larger crystal sizes lead to reduced mechanical properties while finer average crystallite sizes lead to improved mechanical properties (e.g., higher strength and higher hardness). In particular, it is very desirable to form ceramics with densities of at least 90, 95, 97, 98, 99, or even at least 100 percent of theoretical density, wherein the average crystal sizes are less than 0.15 micrometer, or even less than 0.1 micrometer.

In some embodiments of the present invention, the glasses or ceramics comprising glass may be annealed prior to heat-treatment. In such cases annealing is typically done at a temperature less than the $T_x$ of the glass for a time from a few second to few hours or even days. Typically, the annealing is done for a period of less than 3 hours, or even less than an hour. Optionally, annealing may also be carried out in atmospheres other than air. Furthermore, different stages (i.e., the nucleation step and the crystal growth step) of the heat-treatment may be carried out under different atmospheres. It is believed that the $T_g$ and $T_x$, as well as the $T_x$-$T_g$ of glasses according to this invention may shift depending on the atmospheres used during the heat treatment.

One skilled in the art can determine the appropriate conditions from a Time-Temperature-Transformation (TTT) study of the glass using techniques known in the art. One skilled in the art, after reading the disclosure of the present invention should be able to provide TTT curves for glasses used to make glass-ceramics according to the present invention, determine the appropriate nucleation and/or crystal growth conditions to provide glass-ceramics according to the present invention.

Heat-treatment may occur, for example, by feeding the material directly into a furnace at the elevated temperature. Alternatively, for example, the material may be fed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for, example, it may be desirable to heat-treat under gas pressure as in, for example, hot-isostatic press, or in gas pressure furnace. Although not wanting to be bound by theory, it is believed that atmospheres may affect oxidation states of some of the components of the glasses and glass-ceramics. Such variation in oxidation states can bring about varying coloration of glasses and glass-ceramics. In addition, nucleation and crystallization steps can be affected by atmospheres (e.g., the atmosphere may affect the atomic mobilities of some species of the glasses).

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material.

It is within the scope of the present invention to convert (e.g., crush) the resulting article or heat-treated article to provide particles (e.g., abrasive particles according to the present invention).

Typically, glass-ceramics are stronger than the glasses from which they are formed. Hence, the strength of the material may be adjusted, for example, by the degree to which the glass is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, *Glass-Ceramics*, P. W. McMillan, Academic Press, Inc., 2$^{nd}$ edition, 1979.

As compared to many other types of ceramic processing (e.g., sintering of a calcined material to a dense, sintered ceramic material), there is relatively little shrinkage (typically, less than 30 percent by volume; in some embodiments, less than 20 percent, 10 percent, 5 percent, or even less than 3 percent by volume) during crystallization of the glass to form the glass-ceramic. The actual amount of shrinkage depends, for example, on the composition of the glass, the heat-treatment time, the heat-treatment temperature, the heat-treatment pressure, the density of the glass being crystallized, the relative amount(s) of the crystalline phases formed, and the degree of crystallization. The amount of shrinkage can be measured by conventional techniques known in the art, including by dilatometry, Archimedes method, or measuring the dimensions of the material before and after heat-treatment. In some cases, there may be some evolution of volatile species during heat-treatment.

In some embodiments, the relatively low shrinkage feature may be particularly advantageous. For example, articles may be formed in the glass phase to the desired shapes and dimensions (i.e., in near-net shape), followed by heat treatment to at least partially crystallize the glass. As a result, substantial cost savings associated with the manufacturing and machining of the crystallized material may be realized.

In some embodiments, the glass has an x, y, z direction, each of which has a length of at least 1 cm (in some embodiments, at least 5 cm, or even at least 10 cm), wherein the glass has a volume, wherein the resulting glass-ceramic has an x, y, z direction, each of which has a length of at least 1 cm (in some embodiments, at least 5 cm, or even at least 10 cm), wherein the glass-ceramic has a volume of at least 70 (in some embodiments, at least 75, 80, 85, 90, 95, 96, or even at least 97) percent of the glass volume.

For example, during heat-treatment of some exemplary glasses for making glass-ceramics according to present invention, formation of phases such as $La_2Zr_2O_7$ and/or cubic/tetragonal $ZrO_2$, in some cases monoclinic $ZrO_2$, may occur at temperatures above about 900° C. Although not wanting to be bound by theory, it is believed that zirconia-related phases are the first phases to nucleate from the glass. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10-15 nanometers have been observed. For at least some embodiments, heat-treatment at about 1300° C. for about 1 hour provides a full crystallization. In generally, heat-treatment times for each of the nucleation and crystal growth steps may range of a few seconds (in some embodiments, even less than 5 seconds) to several minutes to an hour or more.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "EPOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as Model JSM 840A from JEOL, Peabody, Mass.). A typical back-scattered electron (BSE) micrograph of the microstructure found in the sample is used to determine the average crystallite size as follows. The number of crystallites that intersect per unit length ($N_L$) of a random straight line drawn across the micrograph are counted. The average crystallite size is determined from this number using the following equation.

$$\text{Average Crystal Size} = \frac{1.5}{N_L M},$$

where $N_L$ is the number of crystallites intersected per unit length and M is the magnification of the micrograph.

In another aspect, ceramics (including glass-ceramics) according to the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 1 micrometer, less than 0.5 micrometer, less than 0.3 micrometer, or even less than less than 0.15 micrometer.

Examples of crystalline phases which may be present in ceramics according to the present invention include: alumina (e.g., alpha and transition aluminas), REO, $Y_2O_3$, $HfO_2$, $ZrO_2$ (e.g., cubic $ZrO_2$ and tetragonal $ZrO_2$), one or more other metal oxides such as BaO, CaO, $Cr_2O_3$, CoO, CuO, $Fe_2O_3$, $GeO_2$, $Li_2O$, MgO, MnO, NiO, $Na_2O$, $P_2O_5$, $Sc_2O_3$, $SiO_2$, $Bi_2O_3$, SrO, $TeO_2$, $TiO_2$, $V_2O_5$, ZnO, as well as "complex metal oxides" (including complex $Al_2O_3$.metal oxide (e.g., complex $Al_2O_3$.REO (e.g., $ReAlO_3$ (e.g., $GdAlO_3$, $LaAlO_3$), $ReAl_{11}O_{18}$ (e.g., $LaAl_{11}O_{18}$), and $Re_3Al_5O_{12}$ (e.g., $Dy_3Al_5O_{12}$)), complex $Al_2O_3.Y_2O_3$ (e.g., $Y_3Al_5O_{12}$), and complex $ZrO_2$.REO (e.g., $La_2Zr_2O_7$)) and combinations thereof. Typically, ceramics according to the present invention are free of eutectic microstructure features.

In some embodiments, ceramics according to the present invention further comprise $ZrO_2$ and/or $HfO_2$ up to 30 percent by weight (in some embodiments, in a range from 15 to 30 percent by weight $ZrO_2$ and/or $HfO_2$, based on the total weight of the ceramic.

It is also with in the scope of the present invention to substitute a portion of the aluminum cations in a complex $Al_2O_3$.metal oxide (e.g., complex $Al_2O_3$.REO and/or complex $Al_2O_3.Y_2O_3$ (e.g., yttrium aluminate exhibiting a garnet crystal structure)). For example, a portion of the Al cations in a complex $Al_2O_3.Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3.Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Further, for example, a portion of the rare earth cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. The substitution of cations as described above may affect the properties (e.g. hardness, toughness, strength, thermal conductivity, etc.) of the ceramic.

Additional details (including compositions, making, using, and properties) regarding ceramics (including glasses and glass-ceramics), and methods of making the same, can be found in applications having U.S. Ser. Nos. 09/922,526, 09/922,527, 09/922,528, and 09/922,530, each filed Aug. 2, 2001, now abandoned, U.S. Ser. Nos. 10/211,597, 10/211, 638, 10/211,629, 10/211,598, 10/211,630, 10/211,639, 10/211,034, 10/211,044, 10/211,628, 10/211,491, 10/211, 640, and 10/211,684, each filed Aug. 2, 2002; U.S. Ser. Nos. 10/358,772, 10/358,765, 10/358,910, 10/358,855, and 10/358,708, each filed Feb. 5, 2003; and U.S. Ser. Nos. 10/740,262, 10/794,420, 10/739,440, 10/740,096, 10/739, 441, 10/739,624, and 10/739,439, each filed Dec. 18, 2003.

Crystals formed by heat-treating amorphous material to provide embodiments of glass-ceramics according to the present invention may be, for example, acicular equiaxed, columnar, or flattened splat-like features.

Some embodiments of glasses and glass-ceramics according to the present invention, and some glasses used to make such glass-ceramics, comprise at least 75 percent (in some embodiments, at least 80, 85, or even at least 90; in some embodiments, in a range from 75 to 90) by weight $Al_2O_3$, at least 0.1 percent (in some embodiments, at least 1, at least 5, at least 10, at least 15, at least 20, or 23.9; in some embodiments, in a range from 10 to 23.9, or 15 to 23.9) by weight La$_2$O$_3$, at least 1 percent (in some embodiments, at least 5, at least 10, at least 15, at least 20, or even 24.8; in some embodiments, in a range from 10 to 24.8, 15 to 24.8) by weight Y$_2$O$_3$, and at least 0.1 percent (in some embodiments, at least 1, at least 2, at least 3, at least 4, at least 5, at least 6, at least 7, or even 8; in some embodiments, in a range from 0.1 to 8 or 0.1 to 5, or 0.1 to 2) by weight MgO, based on the total weight of the glass or glass-ceramic, respectively.

Some embodiments of glasses and glass-ceramics according to the present invention, and some glasses used to make such glass-ceramics, comprise at least 75 percent (in some embodiments, at least 80, 85, or even at least 90; in some embodiments, in a range from 75 to 90) by weight Al$_2$O$_3$, and at least 1 percent (in some embodiments, at least 5, at least 10, at least 15, at least 20, or even 25; in some embodiments, in a range from 10 to 25, 15 to 25) by weight Y$_2$O$_3$, based on the total weight of the glass-ceramic or glass, respectively.

Some embodiments of glasses and glass-ceramics according to the present invention, and some glasses used to make such glass-ceramics, comprise at least 75 (in some embodiments, at least 80, 85, or even at least 90) percent by weight Al$_2$O$_3$, and at least 10 (in some embodiments, at least 15, 20, or even at least 25) percent by weight Y$_2$O$_3$ based on the total weight of the glass-ceramic or glass, respectively.

For some embodiments of glasses and glass-ceramics according to the present invention, and some glasses used to make such glass-ceramics comprising ZrO$_2$ and/or HfO$_2$, the amount of ZrO$_2$ and/or HfO$_2$ present may be at least 5, 10, 15, or even at least 20 percent by weight, based on the total weight of the glass-ceramic or glass, respectively.

Although a glass or glass-ceramic, etc. according to the present invention may be in the form of a bulk material, it is also within the scope of the present invention to provide composites comprising a glass, glass-ceramic, etc. according to the present invention. Such a composite may comprise, for example, a phase or fibers (continuous or discontinuous) or particles (including whiskers) (e.g., metal oxide particles, boride particles, carbide particles, nitride particles, diamond particles, metallic particles, glass particles, and combinations thereof) dispersed in a glass, glass-ceramic, etc. according to the present invention, or a layered-composite structure (e.g., a gradient of glass-ceramic to glass used to make the glass-ceramic and/or layers of different compositions of glass-ceramics).

Certain glasses according to the present invention may have, for example, a T$_g$ in a range of about 750° C. to about 950° C.

The average hardness of the material according to the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "EPOMET 3"). The sample is polished for about 3 minutes with a diamond wheel containing 125-micrometer diamonds, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991). The average hardness is an average of 10 measurements.

Certain glasses according to the present invention may have, for example, an average hardness of at least 5 GPa (in some embodiments, at least 6 GPa, 7 GPa, 8 GPa, or 9 GPa; typically in a range of about 5 GPa to about 10 GPa), crystalline ceramics according to the present invention at least 5 GPa (in some embodiments, at least 6 GPa, 7 GPa, 8 GPa, 9 GPa, 10 GPa, 11 GPa, 12 GPa, 13 GPa, 14 GPa, 15 GPa, 16 GPa, 17 GPa, or 18 GPa; typically in a range of about 5 GPa to about 18 GPa), and glass-ceramics according to the present invention or ceramics according to the present invention comprising glass and crystalline ceramic at least 5 GPa (in some embodiments, at least 6 GPa, 7 GPa, 8 GPa, 9 GPa, 10 GPa, 11 GPa, 12 GPa, 13 GPa, 14 GPa, 15 GPa, 16 GPa, 17 GPa, or 18 GPa (or more); typically in a range of about 5 GPa to about 18 GPa). Abrasive particles according to the present invention have an average hardness of at least 15 GPa, in some embodiments, at least 16 GPa, at least 17 GPa, or even at least 18 GPa.

Certain glasses according to the present invention may have, for example, a thermal expansion coefficient in a range of about 5×10$^{-6}$/K to about 11×10$^{-6}$/K over a temperature range of at least 25° C. to about 900° C.

Typically, and desirably, the (true) density, sometimes referred to as specific gravity, of ceramic according to the present invention is typically at least 70% of theoretical density. More desirably, the (true) density of ceramic according to the present invention is at least 75%, 80%, 85%, 90%, 95%, 96%, 97%, 98%, 99%, 99.5% or even 100% of theoretical density. Abrasive particles according to the present invention have densities of at least 85%, 90%, 92%, 95%, 96%, 97%, 98%, 99%, 99.5% or even 100% of theoretical density.

Articles can be made using ceramics according to the present invention, for example, as a filler, reinforcement material, and/or matrix material. For example, ceramic according to the present invention can be in the form of particles and/or fibers suitable for use as reinforcing materials in composites (e.g., ceramic, metal, or polymeric (thermosetting or thermoplastic)). The particles and/or fibers may, for example, increase the modulus, heat resistance, wear resistance, and/or strength of the matrix material. Although the size, shape, and amount of the particles and/or fibers used to make a composite may depend, for example, on the particular matrix material and use of the composite, the size of the reinforcing particles typically range from about 0.1 to 1500 micrometers, more typically 1 to 500 micrometers, and desirably between 2 to 100 micrometers. The amount of particles for polymeric applications is typically about 0.5 percent to about 75 percent by weight, more typically about 1 to about 50 percent by weight. Examples of thermosetting polymers include: phenolic, melamine, urea formaldehyde, acrylate, epoxy, urethane polymers, and the like. Examples of thermoplastic polymers include: nylon, polyethylene, polypropylene, polyurethane, polyester, polyamides, and the like.

Examples of uses for reinforced polymeric materials (i.e., reinforcing particles according to the present invention dispersed in a polymer) include protective coatings, for example, for concrete, furniture, floors, roadways, wood, wood-like materials, ceramics, and the like, as well as, anti-skid coatings and injection molded plastic parts and components.

Further, for example, ceramic according to the present invention can be used as a matrix material. For example, ceramics according to the present invention can be used as a binder for ceramic materials and the like such as diamond, cubic-BN, $Al_2O_3$, $ZrO_2$, $Si_3N_4$, and SiC. Examples of useful articles comprising such materials include composite substrate coatings, cutting tool inserts abrasive agglomerates, and bonded abrasive articles such as vitrified wheels. The ceramics according to the present invention can be used as binders, for example, to increase the modulus, heat resistance, wear resistance, and/or strength of the composite article.

Abrasive particles according to the present invention generally comprise crystalline ceramic (e.g., at least 75, 80, 85, 90, 91, 92, 93, 94, 95, 96, 97, 98, 99, 99.5, or even 100 percent by volume crystalline ceramic). In another aspect, the present invention provides a plurality of particles having a particle size distribution ranging from fine to coarse, wherein at least a portion of the plurality of particles are abrasive particles according to the present invention. In another aspect, embodiments of abrasive particles according to the present invention generally comprise (e.g., at least 75, 80, 85, 90, 91, 92, 93, 94, 95, 96, 97, 98, 99, 99.5, or even 100 percent by volume) glass-ceramic according to the present invention.

Abrasive particles according to the present invention can be screened and graded using techniques well known in the art, including the use of industry recognized grading standards such as ANSI (American National Standard Institute), FEPA (Federation Europeenne des Fabricants de Products Abrasifs), and JIS (Japanese Industrial Standard). Abrasive particles according to the present invention may be used in a wide range of particle sizes, typically ranging in size from about 0.1 to about 5000 micrometers, about 1 to about 2000 micrometers, about 5 to about 1500 micrometers, or even, in some embodiments, from about 100 to about 1500 micrometers.

In a given particle size distribution, there will be a range of particle sizes, from coarse particles to fine particles. In the abrasive art this range is sometimes referred to as a "coarse", "control" and "fine" fractions. Abrasive particles graded according to abrasive industry accepted grading standards specify the particle size distribution for each nominal grade within numerical limits. Such industry accepted grading standards include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS 10,000.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form glass. This recycling may occur after the crushing step, where the particles are in large chunks or smaller pieces (sometimes referred to as "fines") that have not been screened to a particular distribution.

In another aspect, the present invention provides a method for making abrasive particles, the method comprising heat-treating glass particles or particles comprising glass according to the present invention to provide abrasive particles comprising a glass-ceramic according to the present invention. Alternatively, for example, the present invention provides a method for making abrasive particles, the method comprising heat-treating glass according to the present invention, and crushing the resulting heat-treated material to provide abrasive particles comprising a glass-ceramic according to the present invention. When crushed, glass tends to provide sharper particles than crushing significantly crystallized glass-ceramics or crystalline material.

In another aspect, the present invention provides agglomerate abrasive grains each comprising a plurality of abrasive particles according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) according to the present invention. Methods of making such abrasive articles and using abrasive articles are well known to those skilled in the art. Furthermore, abrasive particles according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. Suitable binders include inorganic or organic binders (including thermally curable resins and radiation curable resins). The abrasive particles can be present in one layer or in two layers of the coated abrasive article.

Figure 7:
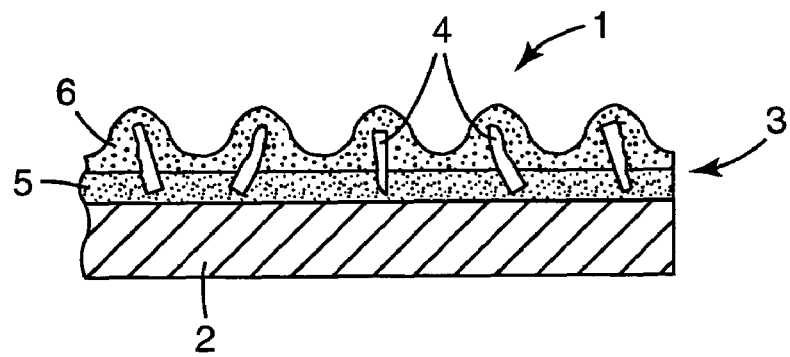
FIG. 7 is a fragmentary cross-sectional schematic view of a coated abrasive article including abrasive particles according to the present invention.

An example of a coated abrasive article is depicted in FIG. 7. Referring to FIG. 7, coated abrasive article 1 has a backing (substrate) 2 and abrasive layer 3. Abrasive layer 3 includes abrasive particles according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3-50% by volume bond material, about 30-90% by volume abrasive particles (or abrasive particle blends), up to 50% by volume additives (including grinding aids), and up to 70% by volume pores, based on the total volume of the bonded abrasive article.

Figure 8:
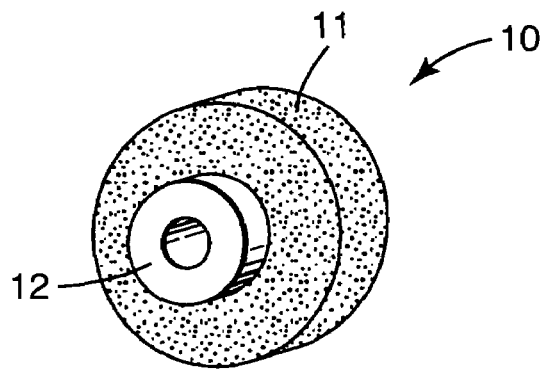
FIG. 8 is a perspective view of a bonded abrasive article including abrasive particles according to the present invention.

An exemplary grinding wheel is shown in FIG. 8. Referring to FIG. 8, grinding wheel 10 is depicted, which includes abrasive particles according to the present invention 11, molded in a wheel and mounted on hub 12.

Figure 9:
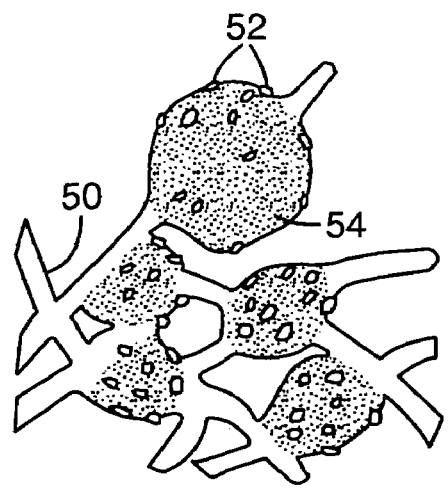
FIG. 9 is an enlarged schematic view of a portion of a nonwoven abrasive article including abrasive particles according to the present invention.

Nonwoven abrasive articles typically include an open porous lofty polymer filament structure having abrasive particles according to the present invention distributed throughout the structure and adherently bonded therein by an organic binder. Examples of filaments include polyester fibers, polyamide fibers, and polyaramid fibers. An exemplary nonwoven abrasive article is shown in FIG. 9. Referring to FIG. 9, a schematic depiction, enlarged about 100×, of a typical nonwoven abrasive article is shown, comprises fibrous mat 50 as a substrate, onto which abrasive particles according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.)). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may be thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.).

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles according to the present invention may be in the shape of a wheel (including cut off wheels), honing stone, mounted pointed or other conventional bonded abrasive shape. In some embodiments, a vitrified bonded abrasive article according to the present invention is in the form of a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

In some embodiments, vitrified bonding materials include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50-300 g/m$^2$ (desirably, about 80-160 g/m$^2$). In vitrified bonded abrasive articles grinding aid is typically impregnated into the pores of the article.

The abrasive articles can contain 100% abrasive particles according to the present invention, or blends of such abrasive particles with other abrasive particles and/or diluent particles. However, at least about 2% by weight, desirably at least about 5% by weight, and more desirably about 30-100% by weight, of the abrasive particles in the abrasive articles should be abrasive particles according to the present invention. In some instances, the abrasive particles according to the present invention may be blended with another abrasive particles and/or diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described in U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie). Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen). Additional details concerning fused abrasive particles, can be found, for example, in U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.), U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 1,247,337 (Poon et al.), U.S. Pat. No. 5,023,212 (Dubots et al.), U.S. Pat. No. 5,143,522 (Gibson et al.), and U.S. Pat. No. 5,336,280 (Dubots et al. ), and applications having U.S. Ser. Nos. 09/495,978, 09/496,422, 09/496,638, and 09/496,713, each filed on Feb. 2, 2000; U.S. Ser. Nos. 09/618,876, 09/618,879, 09/619,106, 09/619,191, 09/619,192, 09/619,215, 09/619,289, 09/619,563, 09/619,729, 09/619,744, and 09/620,262, each filed on Jul. 19, 2000; U.S. Ser. No. 09/704,843, filed Nov. 2, 2000; and U.S. Ser. No. 09/772,730, filed Jan. 30, 2001. Additional details regarding ceramic abrasive particles can be found in applications having U.S. Ser. Nos. 09/922,526, 09/922,527, 09/922,528, and 09/922,530, each filed Aug. 2, 2001, now abandoned, U.S. Ser. Nos. 10/211,597, 10/211,638, 10/211,629, 10/211,598, 10/211,630, 10/211,639, 10/211,034, 10/211,044, 10/211,628, 10/211,491, 10/211,640, and 10/211,684, each filed Aug. 2, 2002, and U.S. Ser. Nos. 10/358,772, 10/358,765, 10/358,910, 10/358,855, and 10/358,708, each filed Feb. 5, 2003.

In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles according to the present invention, with the smaller sized particles being another abrasive particle type. Conversely, for example, the smaller sized abrasive particles may be abrasive particles according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates.

Abrasive particles according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444 and 09/688,484, filed Oct. 16, 2000; U.S. Ser. Nos. 09/688,444, 09/688,484, and 09/688,486, filed Oct. 16, 2000; and U.S. Ser. Nos. 09/971,899, 09/972,315, and 09/972,316, filed Oct. 5, 2001.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles according to the present invention, and the second (outermost) layer comprises abrasive particles according to the present invention. Likewise in a bonded abrasive, there may be two distinct sections of the grinding wheel. The outermost section may comprise abrasive particles according to the present invention, whereas the innermost section does not. Alternatively, abrasive particles according to the present invention may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christianson). Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.). Further details regarding vitreous bonded abrasives can be found, for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi). Further details regarding nonwoven abrasive articles can be found, for example, in U.S. Pat. No. 2,958,593 (Hoover et al.).

The present invention provides a method of abrading a surface, the method comprising contacting at least one abrasive particle according to the present invention, with a surface of a workpiece; and moving at least of one the abrasive particle or the contacted surface to abrade at least a portion of said surface with the abrasive particle. Methods for abrading with abrasive particles according to the present invention range from snagging (i.e., high pressure high stock removal) to polishing (e.g., polishing medical implants with coated abrasive belts), wherein the latter is typically done with finer grades (e.g., ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles according to the present invention may be useful, for example, to abrade workpieces such as aluminum metal, carbon steels, mild steels, tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms.

Advantages and embodiments of this invention are further illustrated by the following non-limiting examples, but the particular materials and amounts thereof recited in these examples, as well as other conditions and details, should not be construed to unduly limit this invention. All parts and percentages are by weight unless otherwise indicated.

Unless otherwise stated, all examples contained no significant amount of $SiO_2$, $Bi_2O_3$, $B_2O_3$, $P_2O_5$, $GeO_2$, $TeO_2$, $As_2O_3$, and $V_2O_5$.

EXAMPLES 1-14

A 250-ml polyethylene bottle (7.3-cm diameter) was charged with a 50-gram mixture of various powders (as shown below in Table 1, with sources of the raw materials listed in Table 2), 75 grams of isopropyl alcohol, and 200 grams of alumina milling media (cylindrical in shape, both height and diameter of 0.635 cm; 99.9% alumina; obtained from Coors, Golden Colo.). The contents of the polyethylene bottle were milled for 16 hours at 60 revolutions per minute (rpm). After the milling, the milling media were removed and the slurry was poured onto a warm (about 75° C.) glass ("PYREX") pan and dried at room temperature (about 25° C.). The dried mixture was screened through a 70-mesh screen (212-micrometer opening size) with the aid of a paint brush.

After screening, the mixture of milled feed particles was fed slowly (0.5 gram/minute) into a hydrogen/oxygen torch flame to melt the particles. The torch used to melt the particles, thereby generating molten droplets, was a Bethlehem bench burner PM2D Model B obtained from Bethlehem Apparatus Co., Hellertown, Pa. Hydrogen and oxygen flow rates for the torch were as follows. For the inner ring, the hydrogen flow rate was 8 standard liters per minute (SLPM) and the oxygen flow rate was 3.5 SLPM. For the outer ring, the hydrogen flow rate was 23 SLPM and the oxygen flow rate was 12 SLPM. The dried and sized particles were fed slowly (0.5 gram/minute) into the torch flame which melted the particles and carried them directly into a 19-liter (5-gallon) cylindrical container (30 centimeters (cm) diameter by 34 cm height) of continuously circulating, turbulent water to rapidly quench the molten droplets. The angle at which the flame hit the water was about 45°, and the flame length, burner to water surface, was about 18 centimeters (cm) in diameter. The resulting molten and quenched particles were collected in a pan and dried at 110° C. The particles were spherical in shape (hereinafter referred to as "beads") and varied in size from a few micrometers up to 250 micrometers and were either transparent (i.e., amorphous) and/or opaque (i.e., crystalline), varying bead-to-bead.

A percent amorphous yield was calculated from the resulting flame-formed beads using a −100+120 mesh size fraction (i.e., the fraction collected between 150-micrometer opening size and 125-micrometer opening size screens). The measurements were done in the following manner. A single layer of beads was spread out upon a glass slide. The beads were observed using an optical microscope. Using the crosshairs in the optical microscope eyepiece as a guide, beads that lay along a straight line were counted either amorphous or crystalline depending on their optical clarity (i.e., amorphous if they were clear). A total of 500 beads were counted and a percent amorphous yield was determined by the amount of amorphous beads divided by total beads counted.

The phase composition (amorphous/crystalline) was determined through Differential Thermal Analysis (DTA). The material was classified as amorphous if the corresponding DTA trace of the material contained an exothermic crystallization event ($T_x$). If the same trace also contained an endothermic event ($T_g$) at a temperature lower than $T_x$ it was considered to include a glass phase. If the DTA trace of the material contained no such events, it was considered to contain crystalline phases.

Differential thermal analysis (DTA) was conducted on beads of Example 1 using the following method. A DTA run was made (using an instrument obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample was placed in a 100-microliter $Al_2O_3$ sample holder. Each sample was heated in nitrogen atmosphere at a rate of 10° C./minute from room temperature (about 25° C.) to 1100° C.

The DTA trace of the beads prepared in Example 1 exhibited an endothermic event at a temperature around 870° C., as evidenced by a downward change in the curve of the trace. It is believed this event was due to the glass transition ($T_g$) of the glass material. The same material exhibited an exothermic event at a temperature around 920° C., as evidenced by a sharp peak in the trace. It is believed that this event was due to the crystallization ($T_x$) of the material. Thus, the material was determined to be glassy.

DTA was conducted as described above on Examples 2-15. The corresponding glass transition ($T_g$) and crystallization ($T_x$) temperatures are listed in Table 1, below.

TABLE 1

| Example | Batch amounts, g | Weight percent of components | Percent amorphous Yield | Glass transition, ° C. | Glass Crystallization, ° C. | Nitrogen content, wt. % |
|---|---|---|---|---|---|---|
| Comp. A | $Al_2O_3$: 20.49<br>$ZrO_2$: 9.6<br>$La_2O_3$: 20.45 | $Al_2O_3$: 40.98<br>$ZrO_2$: 18.12<br>$La_2O_3$: 40.9 | NM | 863 | 932 | ND |
| 1 | $Al_2O_3$: 19.46<br>AlN: 2.5<br>$La_2O_3$: 19.42<br>$ZrO_2$: 8.61 | $Al_2O_3$: 38.92<br>AlN: 5.0<br>$La_2O_3$: 38.84<br>$ZrO_2$: 17.22 | NM | 858 | 926 | 0.26 |
| 2 | $Al_2O_3$: 24.7<br>AlN: 2.5<br>$La_2O_3$: 22.8 | $Al_2O_3$: 49.4<br>AlN: 5<br>$La_2O_3$: 45.6 | NM | 853 | 926 | 0.21 |
| 3 | $Al_2O_3$: 15.8<br>AlN: 6.4<br>$La_2O_3$: 19.0<br>$ZrO_2$: 8.9 | $Al_2O_3$: 31.6<br>AlN: 12.7<br>$La_2O_3$: 38.0<br>$ZrO_2$: 17.7 | 85 | NM | NM | NM |
| 4 | $Al_2O_3$: 13.3<br>AlN: 8.9<br>$La_2O_3$: 19.0<br>$ZrO_2$: 8.9 | $Al_2O_3$: 26.6<br>AlN: 17.7<br>$La_2O_3$: 38.0<br>$ZrO_2$: 17.7 | 94 | NM | NM | 0.54 |
| 5 | $Al_2O_3$: 18.3<br>AlN: 3.9<br>$La_2O_3$: 19<br>$ZrO_2$: 8.9 | $Al_2O_3$: 36.6<br>AlN: 7.7<br>$La_2O_3$: 38.0<br>$ZrO_2$: 17.7 | 84 | NM | NM | NM |
| 6 | $Al_2O_3$: 18.3<br>$La_2O_3$: 20.2<br>$ZrO_2$: 9<br>$Si_3N_4$: 2.5 | $Al_2O_3$: 36.6<br>$La_2O_3$: 40.4<br>$ZiO_2$: 18.0<br>$Si_3N_4$: 5.0 | 88 | NM | NM | NM |
| 7 | $Al_2O_3$: 5.3<br>Al: 8.4<br>$La_2O_3$: 23.2<br>$ZrO_2$: 10.4<br>$Si_3N_4$: 2.8 | $Al_2O_3$: 10.5<br>Al: 16.7<br>$La_2O_3$: 46.4<br>$ZrO_2$: 20.7<br>$Si_3N_4$: 5.7 | 93 | 832 | 915 | NM |
| 8 | $Al_2O_3$: 5.3<br>Al: 8.3<br>$La_2O_3$: 20.7<br>$ZrO_2$: 10.3<br>$Si_3N_4$: 1.5<br>SiC: 1.5 | $Al_2O_3$: 10.5<br>Al: 16.7<br>$La_2O_3$: 46.4<br>$ZrO_2$: 20.7<br>$Si_3N_4$: 2.9<br>SiC: 2.9 | 96 | 832 | 918 | NM |
| 9 | $Al_2O_3$: 19.5<br>$Gd_2O_3$: 19.5<br>$ZrO_2$: 8.6<br>$Si_3N_4$: 2.5 | $Al_2O_3$: 39.0<br>$Gd_2O_3$: 39.0<br>$ZrO_2$: 17.1<br>$Si_3N_4$: 5.0 | 95 | 867 | 923 | NM |
| 10 | $Al_2O_3$: 19.5<br>$Gd_2O_3$: 19.5<br>$ZrO_2$: 8.6<br>$Si_3N_4$: 1.3<br>SiC: 1.3 | $Al_2O_3$: 39.0<br>$Gd_2O_3$: 39.0<br>$ZrO_2$: 17.1<br>$Si_3N_4$: 2.5<br>SiC: 2.5 | 91 | NM | NM | NM |
| 11 | $Al_2O_3$: 17.1<br>Al: 9<br>AlN: 4.2<br>$Y_2O_3$: 19.7 | $Al_2O_3$: 34.1<br>Al: 18.0<br>AlN: 8.4<br>$Y_2O_3$: 39.4 | 88 | NM | NM | NM |
| 12 | $Al_2O_3$: 10.1<br>Al: 16.0<br>$Y_2O_3$: 20.7<br>$Si_3N_4$: 6.2 | $Al_2O_3$: 20.1<br>Al: 32.0<br>$Y_2O_3$: 41.5<br>$Si_3N_4$: 6.4 | 97 | 857 | 905 | NM |

TABLE 1-continued

| Example | Batch amounts, g | Weight percent of components | Percent amorphous Yield | Glass transition, °C. | Glass Crystallization, °C. | Nitrogen content, wt. % |
|---|---|---|---|---|---|---|
| 13 | $Al_2O_3$: 16.1<br>Al: 8.5<br>AlN: 3.9<br>$Y_2O_3$: 18.6<br>$Si_3N_4$: 2.9 | $Al_2O_3$: 32.1<br>Al: 17.0<br>AlN: 7.9<br>$Y_2O_3$: 37.2<br>$Si_3N_4$: 5.8 | 95 | NM | NM | NM |
| 14 | $Al_2O_3$: 10.1<br>Al: 16.0<br>$Y_2O_3$: 20.7<br>$Si_3N_4$: 1.6<br>SiC: 1.6 | $Al_2O_3$: 20.1<br>Al: 32.0<br>$Y_2O_3$: 41.5<br>$Si_3N_4$: 3.2<br>SiC: 3.2 | 95 | 851 | 910 | NM |

ND—Not determined,
NM—Not measured

TABLE 2

| Raw Material | Source |
|---|---|
| Alumina ($Al_2O_3$) particles | Obtained from Alcoa Industrial Chemicals, Bauxite, AR, under the trade designation "A16SG" |
| Aluminum (Al) particles | Obtained from Alfa Aesar, Ward Hill, MA |
| Aluminum nitride (AlN) particles | Obtained from H. C. Stark, Newton, MA |
| Gadolinium oxide ($Gd_2O_3$) particles | Obtained from Molycorp Inc., Mountain Pass, CA |
| Lanthanum oxide ($La_2O_3$) particles | Obtained from Molycorp Inc., and calcined at 700° C. for 6 hours prior to batch mixing |
| Silicon carbide (SiC) particles | Obtained from Superior Graphite Co., Chicago, IL |
| Silicon nitride ($Si_3N_4$) particles | Obtained from H. C. Stark |
| Yttrium oxide ($Y_2O_3$) particles | Obtained from H. C. Stark |
| Zirconia ($ZrO_2$) particles | (Obtained from Zirconia Sales, Inc., Marietta, GA under the trade designation "DK-2") |

Qualitative analysis of the nitrogen content of Examples 1, 2, and 4 was determined using x-ray fluorescence as follows. A portion of each sample was milled in a boron carbide mortar with ethanol. The resulting slurry was applied to a brass disk, and the disk placed into a stainless steel XRF sample holder. The prepared samples were each analyzed qualitatively and semi-quantitatively for boron (B) to uranium (U) using an X-ray fluorescence spectrometer wavelength dispersive X-ray (obtained under the trade designation "RIGAKU ZSX-100e" from Rugaku, Japan) equipped with a rhodium X-ray source, a vacuum atmosphere, and a 25 mm diameter measurement area. A software program (SQX software included with the spectrometer) was used for semi-quantitative XRF elemental analysis, wherein the software divided individual elemental intensity data by the total intensity observed for each sample, and accounting for absorption/enhancement effects using fundamental parameter algorithms. The results were normalized to 100% within the elemental range utilized (in this case, from boron to uranium). The corresponding N amounts are listed in the Table 1, above.

Example 3-5 and 11-14 amorphous beads were crystallized by heat-treating at 1300° C. for 15 minutes, ramp rate of 15° C./min, in a resistively-heated furnace in an atmosphere of flowing nitrogen. The beads resulting from the heat-treatment were opaque as observed using an optical microscope (prior to heat-treatment, the beads were transparent). The opacity of the heat-treated beads is believed to be a result of the crystallization of the beads. Amorphous materials are typically predominantly transparent due to the lack of light scattering centers such as crystal boundaries, while the crystalline particles are opaque due to light scattering effects of the crystal boundaries. The nitrogen content of crystallized Example 4 beads was analyzed as discussed above for Examples 1, 2, and 4 and found to be 0.52 wt. %.

EXAMPLE 15

About 25 grams of the amorphous beads of Example 4 were placed in a graphite die and hot-pressed using a uniaxial pressing apparatus (obtained under the trade designation "HP-50", Thermal Technology Inc., Brea, Calif.). The hot pressing was carried out in a nitrogen atmosphere and 13.8 megapascals (MPa) (2000 pounds per square inch (2 ksi)) pressure. The hot pressing furnace was ramped up to 970° C. at 25° C./minute. The resulting transparent disk, about 34 millimeters (mm) in diameter and 6 mm in thickness, was crushed by using a "Chipmunk" jaw crusher (Type VD, manufactured by BICO Inc., Burbank, Calif.) into particles and graded to retain the −30+35 fraction (i.e., the fraction collected between 600-micrometer opening size and 500-micrometer opening size screens) and the −35+40 mesh fraction (i.e., the fraction collected 500-micrometer opening size and 425-micrometer opening size screens).

DTA traces were conducted as described above in Examples 1-14 to confirm that Example 15 was still amorphous following the hot pressing process. The hot pressed material exhibited a glassy structure as evident by a glass transitions ($T_g$) and crystallizations ($T_x$) temperature.

The crush and graded particles were crystallized by heat-treating at 1300° C. for 15 minutes in an electrically heated furnace to provide abrasive particles. The particles resulting from the heat-treatment were opaque as observed using an optical microscope (prior to heat-treatment, the particles were transparent). The opacity of the heat-treated particles is believed to be a result of the crystallization of the particles. Amorphous materials (including glassy materials) are typically predominantly transparent due to the lack of light scattering centers such as crystal boundaries, while the crystalline particles are opaque due to light scattering effects of the crystal boundaries.

The density of the abrasive particles was measured using a pycnometer (Obtained from Micromeritics, Norcross, Ga., under the trade designation "Accupyc 1330"). The density was found to be 3.92 g/cm³.

A fraction of crystallized particles were mounted in mounting resin (obtained under the trade designation "TRANSOPTIC POWDER" from Buehler, Lake Bluff, Ill.) in a cylinder of resin about 2.5 cm in diameter and about 1.9 cm high. The mounted section was prepared using conventional polishing techniques using a polisher (obtained from Buehler, Lake Bluff, Ill. under the trade designation "EPOMET 3"). The sample was polished for about 3 minutes with a diamond wheel containing 125-micrometer diamonds, followed by 5 minutes of polishing with each of 45, 30, 15, 9, 3, and 1-micrometer slurries. The microhardness measurements are made using a conventional microhardness tester (obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991). The hardness of the Example 16 crystallized (heat-treated), based on an average of 10 measurements, was found to be 18.8 GPa.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Glass comprising (a) in a range from 35 to 65 percent by weight $Al_2O_3$ and (b) at least 0.1 percent by weight N, based on the total weight of the glass, wherein the glass contains not more than 10 percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass.

2. The glass according to claim 1, wherein the glass comprises at least 0.2 percent by weight N, based on the total weight of the glass.

3. The glass according to claim 1, wherein the glass further comprises at least one metal oxide other than $Al_2O_3$ selected from the group consisting of BaO, CaO, $CeO_2$, CuO, $Dy_2O_3$, $Er_2O_3$, $Eu_2O_3$, $Gd_2O_3$, $Ho_2O_3$, $La_2O_3$, $Lu_2O_3$, MgO, $Nd_2O_3$, $Pr_6O_{11}$, $Sm_2O_3$, $Sc_2O_3$, SrO, $Tb_2O_3$, $Th_4O_7$, $TiO_2$, $Tm_2O_3$, $Yb_2O_3$, $Y_2O_3$, $ZrO_2$, and combinations thereof.

4. Ceramic comprising the glass according to claim 1.

5. A method for making a glass according to claim 1, the method comprising:
providing a melt comprising sources of $Al_2O_3$ and N sufficient to provide the melt with $Al_2O_3$ in a range from 35 to 65 percent by weight and (b) at least 0.1 percent by weight N, wherein the melt contains not more than 10 percent by weight collectively $As_2O_3$, $Bi_2O_3$, $B_2O_3$, $GeO_2$, $P_2O_5$, $SiO_2$, $TeO_2$, and $V_2O_5$, based on the total weight of the melt; and
cooling the melt to provide the glass.

6. A method for making an article comprising glass, the method comprising:
providing glass beads comprising glass according to claim 1, the glass having a $T_g$;
heating the glass beads above the $T_g$ such that the glass beads coalesce to form a shape; and
cooling the coalesced shape to provide the article.

7. A method for making an article comprising glass, the method comprising:
providing glass powder comprising glass according to claim 1, the glass having a $T_g$;
heating the glass powder above the $T_g$ such that the glass powder coalesces to form a shape; and
cooling the coalesced shape to provide the article.

8. A method of making a glass-ceramic, the method comprising heat-treating glass according to claim 1 to convert at least a portion of the glass to the glass-ceramic.

9. Glass comprising (a) in a range from 40 to 65 percent by weight $Al_2O_3$, based on the total weight of the glass, (b) a first metal oxide other than $Al_2O_3$, (c) a second, different metal oxide other than $Al_2O_3$, and (d) at least 0.1 percent by weight N, based on the total weight of the glass, wherein the $Al_2O_3$, the first metal oxide, and the second metal oxide collectively comprise at least 75 percent by weight of the glass, and wherein the glass contains not more than 25 percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass.

10. Ceramic comprising the glass according to claim 9.

11. A method for making a glass according to claim 9, the method comprising:
providing a melt comprising sources of $Al_2O_3$, a first metal oxide other than $Al_2O_3$, a second, different metal oxide other than $Al_2O_3$, and N, wherein the $Al_2O_3$, and N is present in an amount sufficient to provide the melt $Al_2O_3$ in a range from 35 to 65 and at least 0.1 percent by weight N, wherein at least 70 percent by weight of the melt comprises the $Al_2O_3$, the first metal oxide, and the second metal oxide, and wherein the melt contains not more than 30 percent by weight collectively $As_2O_3$, $Bi_2O_3$, $B_2O_3$, $GeO_2$, $P_2O_5$, $SiO_2$, $TeO_2$, and $V_2O_5$, based on the total weight of the melt; and
cooling the melt to provide the glass.

12. A method for making an article comprising glass, the method comprising:
providing glass beads comprising glass according to claim 9, the glass having a $T_g$;
heating the glass beads above the $T_g$ such that the glass beads coalesce to form a shape; and
cooling the coalesced shape to provide the article.

13. A method for making an article comprising glass, the method comprising:
providing glass powder comprising glass according to claim 9, the glass having a $T_g$;
heating the glass powder above the $T_g$ such that the glass powder coalesces to form a shape; and
cooling the coalesced shape to provide the article.

14. A method of making a glass-ceramic, the method comprising heat-treating glass according to claim 9 to convert at least a portion of the glass to the glass-ceramic.

15. Glass comprising $Al_2O_3$ in a range from 35 to 65 percent by weight, at least 0.1 percent by weight N, based on the total weight of the glass, at least one of REO or $Y_2O_3$, and at least one of $ZrO_2$ or $HfO_2$, wherein at least 80 percent by weight of the glass collectively comprises the $Al_2O_3$, the at least one of REO or $Y_2O_3$, and the at least one of $ZrO_2$ or $HfO_2$, based on the total weight of the glass.

16. The glass according to claim 15, wherein the glass comprises at least 0.2 percent by weight N, based on the total weight of the glass, and wherein at least 80 percent by weight of the glass collectively comprises the $Al_2O_3$, the at least one of REO or $Y_2O_3$, and the at least one of $ZrO_2$ or $HfO_2$, based on the total weight of the glass.

17. Ceramic comprising the glass according to claim 15.

18. A method for making a glass according to claim 15, the method comprising:
providing a melt comprising sources of $Al_2O_3$, at least one of REO or $Y_2O_3$, and at least one of $ZrO_2$ or $HfO_2$, and N, wherein the $Al_2O_3$ is present in an amount sufficient to provide the melt with in a range from 35 to 65 percent by weight $Al_2O_3$, wherein the N is present in an amount sufficient to provide the melt with at least 0.1 percent by weight N, and wherein at least 80 percent by weight of the melt comprises the $Al_2O_3$, the at least one of REO or $Y_2O_3$, and the at least one of $ZrO_2$ or $HfO_2$, based on the total weight of the melt; and cooling the melt to provide the glass.

19. A method for making an article comprising glass, the method comprising:

providing glass beads comprising glass according to claim 15, the glass having a $T_g$;

heating the glass beads above the $T_g$ such that the glass beads coalesce to form a shape; and cooling the coalesced shape to provide the article.

20. A method for making an article comprising glass, the method comprising:

providing glass powder comprising glass according to claim 15, the glass having a $T_g$;

heating the glass powder above the $T_g$ such that the glass powder coalesces to form a shape; and cooling the coalesced shape to provide the article.

21. A method of making a glass-ceramic, the method comprising heat-treating glass according to claim 15 to convert at least a portion of the glass to the glass-ceramic.

22. Glass-ceramic comprising (a) in a range from 35 percent by weight $Al_2O_3$ and (b) at least 0.1 percent by weight N, based on the total weight of the glass-ceramic, wherein the glass-ceramic contains not more than 10 percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass-ceramic.

23. The glass-ceramic according to claim 22, wherein the glass-ceramic comprises and at least 0.2 percent by weight of N, based on the total weight of the glass-ceramic.

24. Abrasive particles comprising the glass-ceramic according to claim 22.

25. A plurality of abrasive particles having a specified nominal grade, wherein at least a portion of the plurality of abrasive particles are abrasive particle according to claim 22.

26. An abrasive article comprising a binder and a plurality of abrasive particles, wherein at least a portion of the abrasive particles are the abrasive particles according to claim 22.

27. The abrasive article according to claim 26, wherein the abrasive article is a bonded abrasive article, a non-woven abrasive article, or a coated abrasive article.

28. A method for making a glass according to claim 22, the method comprising:

heat treating glass to convert at least a portion of the glass to the glass-ceramic, the glass comprising (a) in a range from 35 to 65 percent by weight $Al_2O_3$ and (b) at least 0.1 percent by weight N, based on the total weight of the glass, wherein the glass contains not more than 10 percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass.

29. A method for making an article, the method comprising:

providing glass beads comprising glass, the glass comprising (a) in a range from 35 to 65 percent by weight $Al_2O_3$ and (b) at least 0.1 percent by weight N, based on the total weight of the glass, wherein the glass contains not more than 10 percent by weight collectively $As_2O_3$, $Bi_2O_3$, $B_2O_3$, $GeO_2$, $P_2O_5$, $SiO_2$, $TeO_2$, and $V_2O_5$, based on the total weight of glass, and the glass having a $T_g$;

heating the glass beads above the $T_g$ such that the glass beads coalesce to form a shape; and heat-treating the coalesced glass to convert at least a portion of the glass to the glass-ceramic according to claim 22.

30. A method for making an article, the method comprising:

providing glass powder comprising glass, the glass comprising (a) in a range from 35 to 65 percent by weight $Al_2O_3$ and (b) at least 0.1 percent by weight N, based on the total weight of the glass, wherein the glass contains not more than 10 percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass, and, the glass having a $T_g$;

heating the glass powder above the $T_g$ such that the glass powder coalesces to form a shape; and heat-treating the coalesced glass to convert at least a portion of the glass to the glass-ceramic according to claim 22.

31. Glass-ceramic comprising (a) in a range from 35 to 65 percent by weight $Al_2O_3$, based on the total weight of the glass-ceramic, (b) a first metal oxide other than $Al_2O_3$, (c) a second, different metal oxide other than $Al_2O_3$, and (d) at least 0.1 percent by weight N, based on the total weight of the glass-ceramic, wherein the $Al_2O_3$, the first metal oxide, and the second metal oxide collectively comprise at least 70 percent by weight of the glass-ceramic, and wherein the glass-ceramic contains not more than 30 percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass-ceramic.

32. The glass-ceramic according to claim 31, wherein the glass-ceramic comprises at least 0.2 percent by weight N, based on the total weight of the glass-ceramic, and wherein the $Al_2O_3$, the first metal oxide, and the second metal oxide collectively comprise at least 75 percent by weight of the glass, based on the total weight of the glass-ceramic.

33. Abrasive particles comprising the glass-ceramic according to claim 31.

34. A plurality of abrasive particles having a specified nominal grade, wherein at least a portion of the plurality of abrasive particles are abrasive particle according to claim 33.

35. An abrasive article comprising a binder and a plurality of abrasive particles, wherein at least a portion of the abrasive particles are the abrasive particles according to claim 33.

36. The abrasive article according to claim 35, wherein the abrasive article is a bonded abrasive article, a non-woven abrasive article, or a coated abrasive article.

37. A method for making a glass-ceramic, the method comprising:

heat treating glass to convert at least a portion of the glass to the glass-ceramic according to claim 31, the glass comprising (a) in a range from 35 to 65 percent by weight $Al_2O_3$, based on the total weight of the glass, (b) a first metal oxide other than $Al_2O_3$, (c) a second, different metal oxide other than $Al_2O_3$, and (d) at least 0.1 percent by weight N, based on the total weight of the glass, wherein the $Al_2O_3$, the first metal oxide, and the second metal oxide collectively comprise at least 70 percent by weight of the glass, and wherein the glass contains not more than 30 percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass.

38. A method for making an article, the method comprising:

providing glass beads comprising glass, the glass comprising (a) in a range from 35 to 65 percent by weight $Al_2O_3$, based on the total weight of the glass, (b) a first metal oxide other than $Al_2O_3$, (c) a second, different metal oxide other than $Al_2O_3$, and (d) at least 0.1 percent by weight N, based on the total weight of the glass, wherein the $Al_2O_3$, the first metal oxide, and the second metal oxide collectively comprise at least 70 percent by weight of the glass, and wherein the glass contains not more than 30 percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass, and the glass having a $T_g$;

heating the glass beads above the $T_g$ such that the glass beads coalesce to form a shape; and heat-treating the coalesced glass to convert at least a portion of the glass to the glass-ceramic according to claim 31.

39. A method for making an article, the method comprising:

providing glass powder comprising glass, the glass comprising (a) in a range from 35 to 65 percent by weight $Al_2O_3$, based on the total weight of the glass, (b) a first metal oxide other than $Al_2O_3$, (c) a second, different metal oxide other than $Al_2O_3$, and (d) at least 0.1 percent by weight N, based on the total weight of the glass, wherein the $Al_2O_3$, the first metal oxide, and the second metal oxide collectively comprise at least 70 percent by weight of the glass, and wherein the glass contains not more than 30 percent by weight collectively $As_2O_3$, $Bi_2O_3$, $B_2O_3$, $GeO_2$, $P_2O_5$, $SiO_2$, $TeO_2$, and $V_2O_5$, based on the total weight of the glass, and, the glass having a $T_g$;

heating the glass powder above the $T_g$ such that the glass powder coalesces to form a shape; and heat-treating the coalesced glass to convert at least a portion of the glass to the glass-ceramic according to claim 31.

40. Glass-ceramic comprising $Al_2O_3$ in a range from 35 to 65 percent by weight, at least 0.1 percent by weight N, based on the total weight of the glass-ceramic, at least one of REO or $Y_2O_3$, and at least one of $ZrO_2$ or $HfO_2$, wherein at least 80 percent by weight of the glass-ceramic collectively comprises the $Al_2O_3$, the at least one of REO or $Y_2O_3$, and the at least one of $ZrO_2$ or $HfO_2$, based on the total weight of the glass-ceramic.

41. The glass-ceramic according to claim 40, wherein the glass-ceramic comprises at least 0.2 percent by weight N, based on the total weight of the glass-ceramic, wherein at least 80 percent by weight of the glass-ceramic collectively comprises the $Al_2O_3$, the at least one of REO or $Y_2O_3$, and the at least one of $ZrO_2$ or $HfO_2$, based on the total weight of the glass-ceramic, and wherein the glass-ceramic comprises at least 60 percent by weight $Al_2O_3$, based on the total weight of the glass-ceramic.

42. Abrasive particles comprising the glass-ceramic according to claim 40.

43. A plurality of abrasive particles having a specified nominal grade, wherein at least a portion of the plurality of abrasive particles are abrasive particle according to claim 42.

44. An abrasive article comprising a binder and a plurality of abrasive particles, wherein at least a portion of the abrasive particles are the abrasive particles according to claim 42.

45. The abrasive article according to claim 44, wherein the abrasive article is a bonded abrasive article, a non-woven abrasive article, or a coated abrasive article.

46. A method for making a glass-ceramic, the method comprising:

heat treating glass to convert at least a portion of the glass to the glass-ceramic according to claim 40, the glass comprising $Al_2O_3$ in a range from 35 to 65 percent by weight, at least 0.1 percent by weight N, based on the total weight of the glass, at least one of REO or $Y_2O_3$, and at least one of $ZrO_2$ or $HfO_2$, wherein at least 80 percent by weight of the glass collectively comprises the $Al_2O_3$, the at least one of REO or $Y_2O_3$, and the at least one of $ZrO_2$ or $HfO_2$, based on the total weight of the glass.

\* \* \* \* \*

UNITED STATES PATENT AND TRADEMARK OFFICE
CERTIFICATE OF CORRECTION

| | |
|---|---|
| PATENT NO. | : 7,332,453 B2 |
| APPLICATION NO. | : 10/902455 |
| DATED | : February 19, 2008 |
| INVENTOR(S) | : Anatoly Z. Rosenflanz |

It is certified that error appears in the above-identified patent and that said Letters Patent is hereby corrected as shown below:

Title Page, Column 1
Under "U.S. PATENT DOCUMENTS," line 6, delete "3,754,976" and insert -- 3,754,978 --, therefor.

Title Page, Column 2
Under "Abstract," line 1, after "comprising" insert -- 35 to 65% by weight $Al_2O_3$ and at least 0.1% --.

Title Page 2, Column 1
Under "U.S. PATENT DOCUMENTS," line 60, delete "Anderston et al." and insert -- Anderson et al. --, therefor.
Under "U.S. PATENT DOCUMENTS," line 67, delete "Celikkya et al." and insert -- Celikkaya et al. --, therefor.

Title Page 2, Column 2
Under "OTHER PUBLICATIONS," line 10, delete "5,6," and insert -- 5, 6, --, therefor.

Title Page 3, Column 1
Under "OTHER PUBLICATIONS," line 1, after "5241," insert -- 5245, --.
Under "OTHER PUBLICATIONS," line 19, delete "Cream." and insert -- Ceram. --, therefor.
Under "OTHER PUBLICATIONS," line 22, delete "Bill." and insert -- Bull. --, therefor.
Under "OTHER PUBLICATIONS," line 24, delete "ZrO2" and insert -- $ZrO_2$ --, therefor.
Under "OTHER PUBLICATIONS," line 25, delete "Pay" and insert -- Spray --, therefor.
Under "OTHER PUBLICATIONS," line 32, delete "Kondrashow" and insert -- Kondrashov --, therefor.
Under "OTHER PUBLICATIONS," line 32, delete "D ecorit" and insert -- Decorite --, therefor.
Under "OTHER PUBLICATIONS," line 41, delete "of" and insert -- Of --, therefor.
Under "OTHER PUBLICATIONS," line 62, delete "Galsses" and insert -- Glasses --, therefor.
Under "OTHER PUBLICATIONS," line 70, after "Roy," insert -- R., --.

UNITED STATES PATENT AND TRADEMARK OFFICE
CERTIFICATE OF CORRECTION

PATENT NO. : 7,332,453 B2
APPLICATION NO. : 10/902455
DATED : February 19, 2008
INVENTOR(S) : Anatoly Z. Rosenflanz It is certified that error appears in the above-identified patent and that said Letters Patent is hereby corrected as shown below:

Title Page 3, Column 2
Under "OTHER PUBLICATIONS," line 5, delete "amorphous" and insert
-- Amorphous --, therefor.
Under "OTHER PUBLICATIONS," line 24, delete "vo." and insert -- vol. --, therefor.
Under "OTHER PUBLICATIONS," line 39, delete "igh" and insert -- High --, therefor.
Under "OTHER PUBLICATIONS," line 44, delete "stabiligy" and insert -- stability --, therefor.
Under "OTHER PUBLICATIONS," line 53, delete "Solidfied" and insert
-- Solidified --, therefor.
Under "OTHER PUBLICATIONS," line 59, delete "refernece" and insert
-- reference --, therefor.
Under "OTHER PUBLICATIONS," line 63, delete "Alumium" and insert
-- Aluminum --, therefor.
Under "OTHER PUBLICATIONS," line 73, delete "711" and insert -- 771 --, therefor.

Page 4, Column 1
Under "OTHER PUBLICATIONS," line 5, delete "Soilids," and insert -- Solids, --, therefor.

Page 4, Column 2
Under "OTHER PUBLICATIONS," line 1, delete "Stabiligy" and insert -- Stability --, therefor.

Column 1
Line 64, delete "$Sc_2O_3SrO$" and insert -- $Sc_2O_3$, SrO --, therefor.

Column 5
Line 54, delete "$Al_2O_3$.metal oxide" and insert -- $Al_2O_3 \cdot$ metal oxide --, therefor.
Line 58, delete "$Al_2O_3.Y_2O_3$" and insert -- $Al_2O_3 \cdot Y_2O_3$ --, therefor.
Line 61, delete "$Al_2O_3$.REO" and insert -- $Al_2O_3 \cdot$ REO --, therefor.

Column 6
Line 19, delete "$Al_2O_3$.metal oxide" and insert -- $Al_2O_3 \cdot$ metal oxide --, therefor.
Line 30, delete "$Al_2O_3$.metal oxides" and insert -- $Al_2O_3 \cdot$ metal oxides --, therefor.

Column 8
Line 31, delete "DRAWING" and insert -- DRAWINGS --, therefor.

UNITED STATES PATENT AND TRADEMARK OFFICE
CERTIFICATE OF CORRECTION

PATENT NO. : 7,332,453 B2 Page 3 of 3
APPLICATION NO. : 10/902455
DATED : February 19, 2008
INVENTOR(S) : Anatoly Z. Rosenflanz It is certified that error appears in the above-identified patent and that said Letters Patent is hereby corrected as shown below:

Column 9
Line 4, delete "$Al_2O_3$.metal oxides" and insert -- $Al_2O_3$·metal oxides --, therefor.
Lines 31-32, delete "$Y_2O_3$.metal oxides" and insert -- $Y_2O_3$·metal oxides --, therefor.

Column 22
Lines 10-11, delete "$Al_2O_3$.metal oxide" and insert -- $Al_2O_3$·metal oxide --, therefor.
Line 11, delete "$Al_2O_3$.REO" and insert -- $Al_2O_3$·REO --, therefor.
Line 13, delete "$Al_2O_3$.$Y_2O_3$" and insert -- $Al_2O_3$·$Y_2O_3$ --, therefor.
Line 14, delete "$ZrO_2$.REO" and insert -- $ZrO_2$·REO --, therefor.
Line 25, delete "$Al_2O_3$.metal oxide" and insert -- $Al_2O_3$·metal oxide --, therefor.
Line 25, delete "$Al_2O_3$.REO" and insert -- $Al_2O_3$·REO --, therefor.
Line 26, delete "$Al_2O_3$.$Y_2O_3$" and insert -- $Al_2O_3$·$Y_2O_3$ --, therefor.
Line 28, delete "$Al_2O_3$.$Y_2O_3$" and insert -- $Al_2O_3$·$Y_2O_3$ --, therefor.
Line 32, delete "$Al_2O_3$.$Y_2O_3$" and insert -- $Al_2O_3$·$Y_2O_3$ --, therefor.
Line 37, delete "$Al_2O_3$.REO" and insert -- $Al_2O_3$·REO --, therefor.

Column 29
Line 54, delete "1,247,337" and insert -- 4,457,767 --, therefor.

Column 38
Line 4, claim 9, delete "arange" and insert -- a range --, therefor.

Column 39
Line 24, claim 22, after "35" insert -- to 65 --.
Line 48, claim 28, delete "glass" and insert -- glass-ceramic --, therefor.

Signed and Sealed this

Twenty-second Day of September, 2009

David J. Kappos
*Director of the United States Patent and Trademark Office*